(12) United States Patent
Miyakoshi et al.

(10) Patent No.: US 11,745,565 B2
(45) Date of Patent: Sep. 5, 2023

(54) IN-VEHICLE DEVICE TEMPERATURE ADJUSTING DEVICE AND VEHICLE AIR CONDITIONING DEVICE PROVIDED WITH SAME

(71) Applicant: SANDEN AUTOMOTIVE CLIMATE SYSTEMS CORPORATION, Isesaki (JP)

(72) Inventors: Ryo Miyakoshi, Isesaki (JP); Takashi Toyama, Isesaki (JP)

(73) Assignee: SANDEN CORPORATION, Isesaki (JP)

( * ) Notice: Subject to any disclaimer, the term of this patent is extended or adjusted under 35 U.S.C. 154(b) by 69 days.

(21) Appl. No.: 17/608,797

(22) PCT Filed: Apr. 15, 2020

(86) PCT No.: PCT/JP2020/016499
§ 371 (c)(1),
(2) Date: Nov. 4, 2021

(87) PCT Pub. No.: WO2020/235263
PCT Pub. Date: Nov. 26, 2020

(65) Prior Publication Data
US 2022/0314742 A1    Oct. 6, 2022

(30) Foreign Application Priority Data

May 20, 2019  (JP) .................................. 2019-094364

(51) Int. Cl.
*B60H 1/32* (2006.01)
(52) U.S. Cl.
CPC ......... *B60H 1/3225* (2013.01); *B60H 1/3205* (2013.01); *B60H 1/3227* (2013.01);
(Continued)

(58) Field of Classification Search
CPC .. B60H 1/3225; B60H 1/3202; B60H 1/3227; B60H 2001/3257; B60H 2001/3272;
(Continued)

(56) References Cited

U.S. PATENT DOCUMENTS

2020/0086719 A1* 3/2020 Midorikawa ...... B60H 1/00978

FOREIGN PATENT DOCUMENTS

JP        62-293050 A      12/1987
JP        01067565 A  *    3/1989
(Continued)

OTHER PUBLICATIONS

Japanese Office Action dated Oct. 18, 2022, Application No. 2019-094364.
(Continued)

*Primary Examiner* — Marc E Norman
(74) *Attorney, Agent, or Firm* — Baker Botts L.L.P.

(57) ABSTRACT

It is an object to improve the reliability of a temperature adjusting device which cools an in-vehicle device such as a battery by using a refrigerant. A device temperature adjusting device 61 that is an in-vehicle device temperature adjusting device adjusts the temperature of a battery 55 mounted on a vehicle and includes a refrigerant circuit R having a compressor 2 which compresses a refrigerant, an outdoor heat exchanger 7 for letting the refrigerant radiate heat, and a refrigerant-heat medium heat exchanger 64 for cooling the battery 55 by letting the refrigerant absorb heat, and a control device 11. The control device 11 stops the compressor 2 on the basis of the fact that the refrigerant circuit R is blocked.

19 Claims, 16 Drawing Sheets

(52) U.S. Cl.
CPC .............. *B60H 2001/3257* (2013.01); *B60H 2001/3272* (2013.01)

(58) Field of Classification Search
CPC ...... B60H 2001/3267; B60H 2001/327; B60H 2001/3242; B60L 2250/16; B60L 2240/34; B60L 2240/36; B60L 2240/545; B60L 2240/622; F25F 2500/04; F25B 2500/04
See application file for complete search history.

(56) References Cited

FOREIGN PATENT DOCUMENTS

| | | |
|---|---|---|
| JP | 07-332740 A | 12/1995 |
| JP | 2002-089931 A | 3/2002 |
| JP | 2006-132813 A | 5/2006 |
| JP | 2007-028781 A | 2/2007 |
| JP | 2007-147220 A | 6/2007 |
| JP | 2008-096383 A | 4/2008 |
| JP | 2010-091127 A | 4/2010 |
| JP | 2014-037178 A | 2/2014 |
| JP | 2014-213765 A | 11/2014 |
| JP | 5860360 B2 | 2/2016 |
| JP | 5860361 B2 | 2/2016 |
| JP | 2017-154521 A | 9/2017 |
| JP | 2018-184108 A | 11/2018 |
| JP | 2019-021387 A | 2/2019 |

OTHER PUBLICATIONS

Japan Patent Office, International Search Report issued in International Application No. PCT/JP2020/016499, dated Jul. 14, 2020.

* cited by examiner

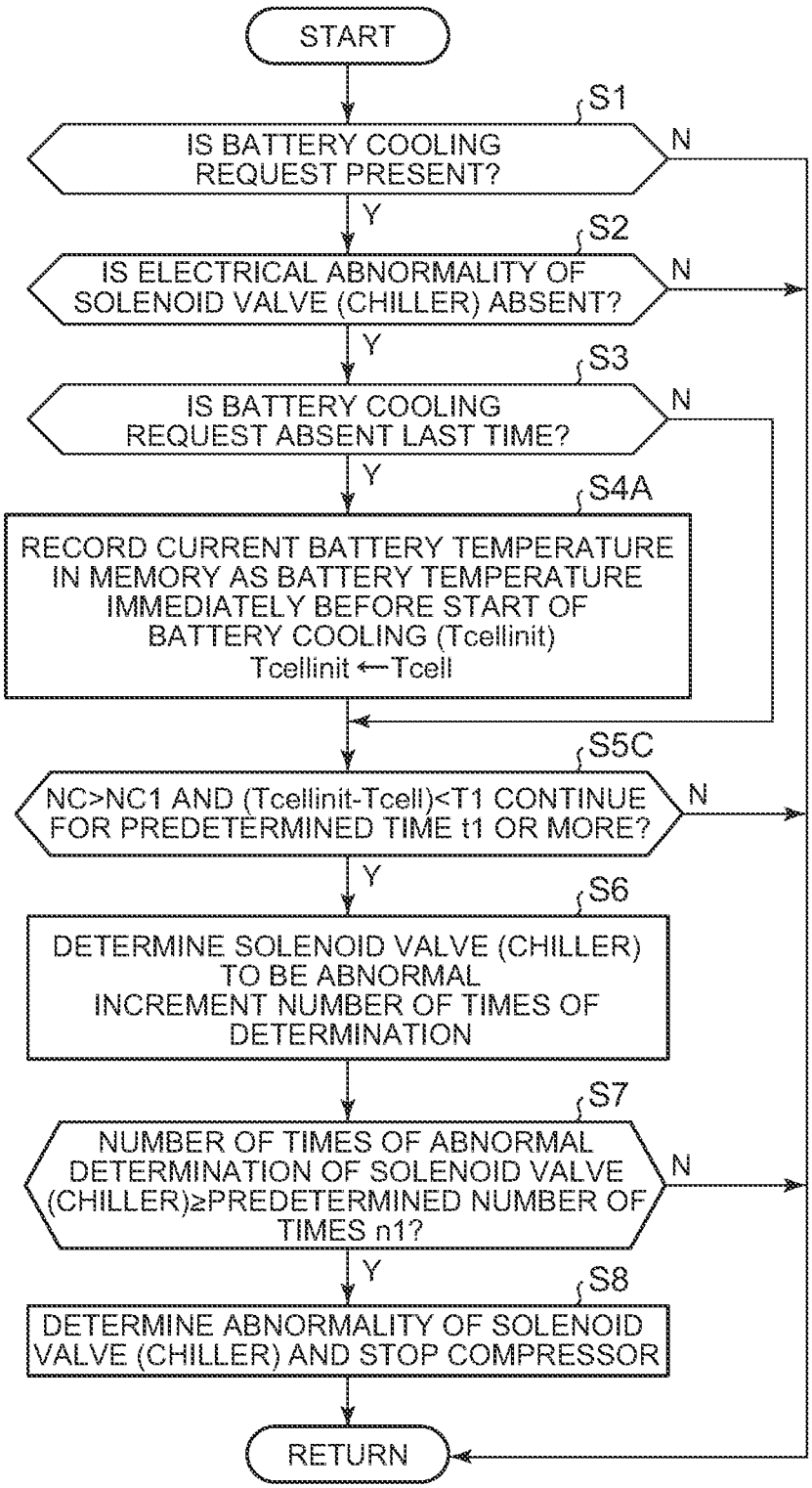

IN-VEHICLE DEVICE TEMPERATURE ADJUSTING DEVICE AND VEHICLE AIR CONDITIONING DEVICE PROVIDED WITH SAME

CROSS-REFERENCE TO RELATED APPLICATIONS

This application is a U.S. National Stage Patent Application under 37 U.S.C. § 371 of International Patent Application No. PCT/JP2020/016499, filed on Apr. 15, 2020, which claims the benefit of Japanese Patent Application No. JP 2019-094364, filed on May 20, 2019, the disclosures of each of which are incorporated herein by reference in their entirety.

TECHNICAL FIELD

The present invention relates to an in-vehicle device temperature adjusting device which adjusts the temperature of a device mounted on a vehicle, and a heat pump type vehicle air conditioning device which includes the in-vehicle device temperature adjusting device and air-conditions the interior of the vehicle.

BACKGROUND ART

Due to actualization of environmental problems in recent years, vehicles such as electric vehicles, plug-in hybrid cars each of which drives a motor for running by power supplied from a battery mounted on the vehicle have spread. Further, as an air conditioning device which is applicable to such a vehicle, there has been developed an air conditioning device which includes a refrigerant circuit to which an electric compressor driven by power supply from a battery, a radiator, a heat absorber, and an outdoor heat exchanger are connected, and which performs letting the refrigerant discharged from the compressor radiate heat in the radiator and letting the refrigerant from which the heat has been radiated in the radiator absorb heat in the outdoor heat exchanger to execute heating, letting the refrigerant discharged from the compressor radiate heat in the outdoor heat exchanger and letting the refrigerant evaporate and absorb heat in the heat absorber to perform cooling, etc., thereby air-conditioning the interior of the vehicle (refer to, for example, Patent Document 1).

Further, for example, a battery mounted on a vehicle rises in temperature due to the ambient temperature environment and self-heating. There has also been developed a vehicle air conditioning device in which since deterioration progresses where charging and discharging are performed in such a high temperature state, a heat exchanger for the battery is separately provided in a refrigerant circuit to perform exchange of heat between a refrigerant circulating in the refrigerant circuit and a heat medium for the battery, and the heat-exchanged heat medium is circulated in the battery, thereby allowing the battery to be cooled (temperature-controlled) (refer to, for example, Patent Document 2 and Patent Document 0.3).

CITATION LIST

Patent Documents

Patent Document 1: Japanese Patent Application Publication No. 2014-213765
Patent Document 2: Japanese Patent No. 5860360
Patent Document 3: Japanese Patent No. 5860361

SUMMARY OF THE INVENTION

Problems to be Solved by the Invention

Here, in the device capable of cooling the battery with the refrigerant of the refrigerant circuit as described above, for example, when a solenoid valve provided in the circuit for allowing the refrigerant to flow through the heat exchanger for the battery fails, the refrigerant circuit is blocked. When the refrigerant circuit is blocked, the refrigerant discharged from the compressor becomes a state of being accumulated in the heat exchanger (outdoor heat exchanger) provided outdoors, thereby causing a problem that the refrigerant and oil do not return to the compressor, and eventually burn-in occurs in the compressor, thus resulting in a situation of its failure.

The present invention has been made to solve such conventional technical problems, and an object thereof is to improve the reliability of a temperature adjusting device which cools an in-vehicle device such as a battery by using a refrigerant and to provide a vehicle air conditioning device including such a temperature adjusting device.

Means for Solving the Problems

There is provided an in-vehicle device temperature adjusting device of the present invention which adjusts the temperature of a device mounted on a vehicle. The in-vehicle device temperature adjusting device is characterized by including a refrigerant circuit having a compressor which compresses a refrigerant, a heat-radiating heat exchanger for letting the refrigerant radiate heat, and a heat-absorbing heat exchanger for letting the refrigerant absorb heat to cool the in-vehicle device, and a control device, and in that the control device stops the compressor based on the blockage of the refrigerant circuit.

The in-vehicle device temperature adjusting device of the invention of claim 2 is characterized in that in the above invention, when a state in which the number of revolutions of the compressor is higher than a predetermined number of revolutions, and the degree of decrease in an index indicating the temperature of the in-vehicle device is smaller than a predetermined value continues for a predetermined time, the control device determines that the refrigerant circuit is blocked.

The in-vehicle device temperature adjusting device of the invention of claim 3 is characterized in that in the above invention, the index indicating the temperature of the in-vehicle device is the temperature of the in-vehicle device.

The in-vehicle device temperature adjusting device of the invention of claim 4 is characterized in that in the invention of claim 2, the in-vehicle device includes a heat medium circulating device which circulates a heat medium, and in that the heat-absorbing heat exchanger cools the heat medium with the refrigerant and cools the in-vehicle device through the heat medium, and the index indicating the temperature of the in-vehicle device is the temperature of the heat medium.

The in-vehicle device temperature adjusting device of the invention of claim 5 is characterized in that in the invention of claim 1, the in-vehicle device includes a heat medium circulating device which circulates a heat medium, and in that the heat-absorbing heat exchanger cools the heat medium with the refrigerant and cools the in-vehicle device through the heat medium, and when a state in which the number of revolutions of the compressor is higher than a predetermined number of revolutions, and the degree of decrease in the temperature of the heat medium after heat exchange with the refrigerant is smaller than a predetermined value continues for a predetermined time, the control device determines that the refrigerant circuit is blocked.

The in-vehicle device temperature adjusting device of the invention of claim 6 is characterized in that in the invention of claim 1, the in-vehicle device includes a heat medium circulating device which circulates a heat medium, and in that the heat-absorbing heat exchanger cools the heat medium with the refrigerant and cools the in-vehicle device through the heat medium, and when a state in which the number of revolutions of the compressor is higher than a predetermined number of revolutions, and the degree of deviation of a cooling capacity of the heat medium circulating device from a cooling capacity of the compressor is larger than a predetermined value continues for a predetermined time, the control device determines that the refrigerant circuit is blocked.

The in-vehicle device temperature adjusting device of the invention of claim 7 is characterized in that in the inventions of claims 4 to 6, even after the compressor is stopped, the control device continues to circulate the heat medium by the heat medium circulating device.

The in-vehicle device temperature adjusting device of the invention of claim 8 is characterized in that in the above respective inventions, the refrigerant circuit has a valve device which controls the inflow of the refrigerant into the heat-absorbing heat exchanger, and the control device determines the blockage of the refrigerant circuit in distinction from an electrical abnormality of the valve device.

The in-vehicle device temperature adjusting device of the invention of claim 8 is characterized in that in the above respective inventions, when the control device determines more than a predetermined number of times that the refrigerant circuit is blocked, the control device stopes the compressor.

The in-vehicle device temperature adjusting device of the invention of claim 10 is characterized in that in the above respective inventions, after the compressor is stopped, the control device permits restarting of the compressor after a lapse of a predetermined time.

The in-vehicle device temperature adjusting device of the invention of claim 11 is characterized in that in the inventions of claims 1 to 9, when the temperature of the refrigerant on the suction side of the compressor becomes greater than or equal to a predetermined value, the control device permits restarting of the compressor.

The in-vehicle device temperature adjusting device of the invention of claim 14 is characterized in that in the above respective inventions, the control device has a predetermined notification device, and when the compressor is stopped based on the blockage of the refrigerant circuit, the notification device executes a predetermined notification operation.

A vehicle air conditioning device of the invention of claim 13 includes an in-vehicle device temperature adjusting device in each invention described above and is characterized in that the refrigerant circuit further includes an indoor heat exchanger for exchanging heat between air supplied to the interior of the vehicle and the refrigerant, and an outdoor heat exchanger as the heat-radiating heat exchanger, which is provided outside the vehicle interior, and air-conditions the interior of the vehicle with the indoor heat exchanger.

Advantageous Effect of the Invention

According to the present invention, a temperature adjusting device which adjusts the temperature of an in-vehicle device includes a refrigerant circuit having a compressor which compresses a refrigerant, a heat-radiating heat exchanger for letting the refrigerant radiate heat, and a heat-absorbing heat exchanger for letting the refrigerant absorb heat to cool the in-vehicle device, and a control device. Since the control device stops the compressor based on the blockage of the refrigerant circuit, it becomes possible to avoid in advance, the failure of the compressor which is caused by the blockage of the refrigerant circuit for cooling the in-vehicle device, and it becomes possible to improve the reliability.

In the above, for example, as in the invention of claim 2, if the control device determines that the refrigerant circuit is blocked where a state in which the number of revolutions of the compressor is higher than a predetermined number of revolutions, and the degree of decrease in an index indicating the temperature of the in-vehicle device is smaller than a predetermined value continues for a predetermined time, it is possible to accurately determine that the refrigerant circuit is blocked, and to avoid in advance, false detection of determining blockage of the refrigerant circuit even though it is not blocked and inconvenience of it being left for a long time even though it is blocked.

As the index indicating the temperature of the in-vehicle device in this case, in addition to the temperature of the in-vehicle device as in the invention of claim 3, the temperature of a heat medium can be adopted as the index indicating the temperature of the in-vehicle device where as in the invention of claim 4, a heat medium circulating device circulating the heat medium is provided in the in-vehicle device to cool the heat medium with the refrigerant in the heat-absorbing heat exchanger and cool the in-vehicle device through the heat medium.

Further, when a heat medium circulating device circulating a heat medium is provided in the in-vehicle device to cool the heat medium with the refrigerant in the heat-absorbing heat exchanger and cool the in-vehicle device through the heat medium, as in the invention of claim 5, the control device is capable of accurately determining that the refrigerant circuit is blocked, even if the refrigerant circuit is determined to be blocked where a state in which the number of revolutions of the compressor is higher than a predetermined number of revolutions, and the degree of decrease in the temperature of the heat medium after heat exchange with the refrigerant is smaller than a predetermined value continues for a predetermined time.

Similarly, when a heat medium circulating device circulating a heat medium is provided in the in-vehicle device to cool the heat medium with the refrigerant in the heat-absorbing heat exchanger and cool the in-vehicle device through the heat medium, as in the invention of claim 6, the control device is capable of accurately determining that the refrigerant circuit is blocked, even if the refrigerant circuit is determined to be blocked where a state in which the number of revolutions of the compressor is higher than a predetermined number of revolutions, and the degree of deviation of a cooling capacity of the heat medium circulating device from a cooling capacity of the compressor is larger than a predetermined value continues for a predetermined time.

Also, as in the invention of claim 7, the control device continues to circulate the heat medium by the heat medium circulating device even after the compressor is stopped. Consequently, it is possible to suppress a rise in the temperature of the in-vehicle device as much as possible by the circulation of the heat medium even after the compressor is stopped due to the blockage of the refrigerant circuit.

Here, when the refrigerant circuit is provided with a valve device which controls the inflow of the refrigerant into the heat-absorbing heat exchanger, the control device is capable of grasping an electrical abnormality of such a valve device. Therefore, as in the invention of claim 8, if the control device is made to determine the blockage of the refrigerant circuit as described above in distinction from the electrical abnormality of the valve device, it is possible to clarify that the blockage has occurred due to a mechanical abnormality of the valve device and clogging of the refrigerant circuit and to encourage the replacement of parts.

Also, as in the invention of claim 8, if the compressor is made to stop when the control device determines more than a predetermined number of times that the refrigerant circuit is blocked, it is possible to effectively avoid the inconvenience that the compressor is stopped unnecessarily due to false detection.

Further, as in the invention of claim 10, if after the compressor is stopped, the control device permits restarting of the compressor after a lapse of a predetermined time, it is possible to avoid in advance, the inconvenience that the suction side of the compressor becomes a negative pressure at the time of restarting. This is the same even if the control device permits the restarting of the compressor when the temperature of the refrigerant on the suction side of the compressor becomes a predetermined value or higher, as in the invention of claim 11.

In addition, as in the invention of claim 14, when a predetermined notification device is provided, and the compressor is stopped based on the blockage of the refrigerant circuit, the control device allows the notification device to execute a predetermined notification operation. Consequently, it is possible to notify a user that the blockage has occurred in the refrigerant circuit and encourage a prompt response.

Then, according to the vehicle air conditioning device of the invention of claim 13, the vehicle air conditioning device includes an in-vehicle device temperature adjusting device in each invention described above. The refrigerant circuit further includes an indoor heat exchanger for exchanging heat between air supplied to the interior of the vehicle and the refrigerant, and an outdoor heat exchanger as the heat-radiating heat exchanger, which is provided outside the vehicle interior, and air-conditions the interior of the vehicle with the indoor heat exchanger. It is therefore possible to realize temperature control of the in-vehicle device having reliability while air-conditioning the vehicle interior.

BRIEF DESCRIPTION OF THE DRAWINGS

FIG. 18 is a flowchart describing a still further embodiment of compressor protection control at the time of refrigerant circuit blockage due to a mechanical abnormality of the solenoid valve (chiller) by the heat pump controller of the control device of FIG. 2 (Embodiment 4).

MODE FOR CARRYING OUT THE INVENTION

Hereinafter, embodiments of the present invention will be described in detail with reference to the drawings.

Embodiment 1

Figure 1:
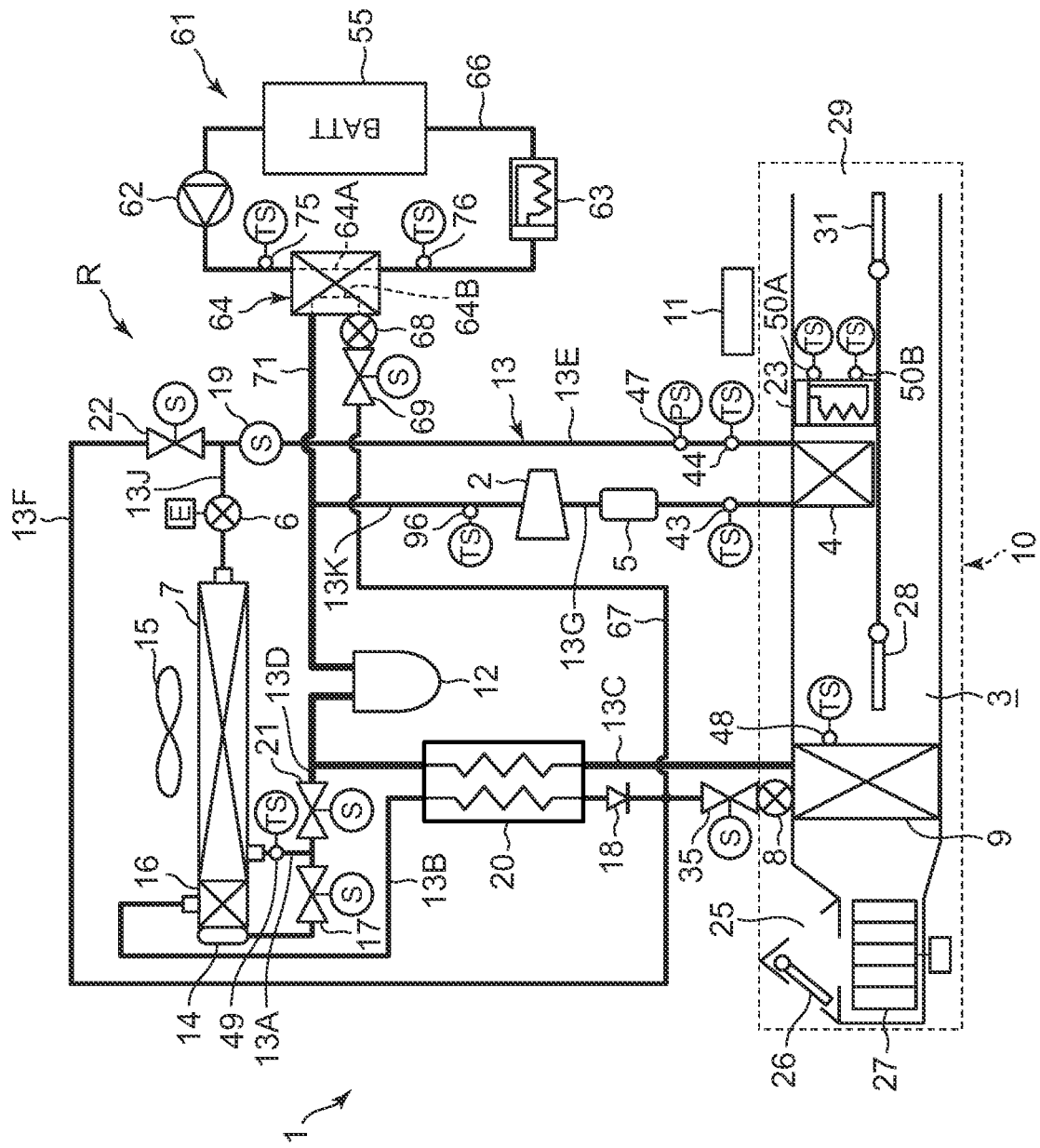
FIG. 1 is a constitutional view of a vehicle air conditioning device (including an in-vehicle device temperature adjusting device) of an embodiment to which the present invention is applied.

FIG. 1 shows a constitutional diagram of a vehicle air conditioning device 1 of an embodiment having an in-vehicle device temperature adjusting device of the present invention. A vehicle of the embodiment to which the present invention is applied is an electric vehicle (EV) in which an engine (internal combustion engine) is not mounted, and which runs with a motor for running (electric motor and not shown in the drawing) which is driven by being supplied with power charged in a battery 55 (e.g., a lithium ion battery) mounted in the vehicle. An electric type of compressor 2 of a refrigerant circuit R to be described later in the vehicle air conditioning device 1 of the present invention and a device temperature adjusting device 61 are also driven by the power supplied from the battery 55.

That is, in the electric vehicle which is not capable of performing heating by engine waste heat, the vehicle air conditioning device 1 of the embodiment changes and executes respective operation modes of a heating mode, a dehumidifying and heating mode, a dehumidifying and cooling mode, a cooling mode, a defrosting mode, an air conditioning (priority)+battery cooling mode, a battery cooling (priority)+air conditioning mode, and a battery cooling (single) mode by a heat pump operation in which the refrigerant circuit R is used, to perform air conditioning of a vehicle interior and temperature regulation of the battery 55.

Incidentally, the vehicle is not limited to the electric vehicle, and the present invention is also effective for a so-called hybrid car in which the engine is used together with the motor for running. Also, the vehicle to which the vehicle air conditioning device 1 of the embodiment is applied is one in which the battery 55 can be charged from an external charger (quick charger or normal charger). Further, the battery 55, the motor for running, the inverter controlling the same, and the like described above become in-vehicle devices (devices to be mounted in the vehicle) in the present invention, but in the following embodiments, the battery 55 will be taken as an example for description.

The vehicle air conditioning device 1 of the embodiment performs air conditioning (heating, cooling, dehumidifying, and ventilation) of the vehicle interior of the electric vehicle. The electric type of compressor 2 to compress a refrigerant, a radiator 4 as an indoor heat exchanger which is provided in an air flow passage 3 of an HVAC unit 10 in which air in the vehicle interior is ventilated and circulated, to let the high-temperature high-pressure refrigerant including oil discharged from the compressor 2 flow therein via a muffler 5 and a refrigerant pipe 13G and to let the refrigerant radiate heat to the vehicle interior (release the heat of the refrigerant), an outdoor expansion valve 6 constituted of an electric valve (electronic expansion valve) which decompresses and expands the refrigerant during the heating, an outdoor heat exchanger 7 which is provided outside the vehicle interior and performs heat exchange between the refrigerant and outdoor air to function as a radiator for radiation to let the refrigerant radiate heat during the cooling or the like and to function as an evaporator to let the refrigerant absorb heat (let the refrigerant suck heat) during the heating or the like, an indoor expansion valve 8 constituted of a mechanical expansion valve to decompress and expand the refrigerant, a heat absorber 9 as an indoor heat exchanger provided in the air flow passage 3 to let the refrigerant to be evaporated during the cooling and dehumidifying and to let the refrigerant absorb heat (let the refrigerant suck heat) from interior and exterior of the vehicle, an accumulator 12, and others are successively connected by a refrigerant pipe 13, whereby the refrigerant circuit R is constituted.

Then, the outdoor expansion valve 6 decompresses and expands the refrigerant flowing out from the radiator 4 and flowing into the outdoor heat exchanger 7 and can also be fully closed. Further, in the embodiment, the indoor expansion valve 3 using the mechanical expansion valve decompresses and expands the refrigerant flowing into the heat absorber 9, and adjusts a superheat degree of the refrigerant in the heat absorber 9.

Incidentally, an outdoor blower 15 is provided in the outdoor heat exchanger 7. The outdoor blower 15 forcibly passes the outdoor air through the outdoor heat exchanger 7 to thereby perform the heat exchange between the outdoor air and the refrigerant, whereby the outdoor air is made to pass through the outdoor heat exchanger 7 even during stopping of the vehicle (i.e., its velocity is 0 km/h).

Further, the outdoor heat exchanger 7 has a receiver drier unit 14 and a supercooling unit 16 sequentially on the downstream side of the refrigerant. A refrigerant pipe 13A on the refrigerant outlet side of the outdoor heat exchanger 7 is connected to the receiver drier unit. 14 via a solenoid valve 17 (for cooling) serving as an open/close valve to be opened when the refrigerant is allowed to flow in the heat absorber 9. A refrigerant pipe 13B on the outlet side of the supercooling unit 16 is connected to the refrigerant inlet side of the heat absorber 9 via an internal heat exchanger 20, a check valve 1A, a solenoid valve 35 (for cabin), and the indoor expansion valve 8 sequentially. Incidentally, the receiver drier unit 14 and the supercooling unit 16 structurally constitutes a part of the outdoor heat exchanger 7. Further, the check valve 18 is configured such that the direction of the solenoid valve 35 (indoor expansion valve 6) serves as a forward direction.

The above-described internal heat exchanger 20 exchanges heat between the refrigerant pipe 13B and the refrigerant pie 13C on the refrigerant outlet side of the heat absorber 9. Further, the refrigerant pipe 13A extending out from the outdoor heat exchanger 7 branches to a refrigerant pipe 13D, and this branching refrigerant pipe 13D communicates and connects with a refrigerant pipe 13C on the refrigerant downstream side from the internal heat exchanger 20 via a solenoid valve 21 (for heating) serving as an open/close valve to be opened during the heating. Then, the refrigerant pipe 13C is connected to the inlet side of the accumulator 12, and the outlet side of the accumulator 12 is connected to a refrigerant pipe 13K on the refrigerant suction side of the compressor 2.

Further, a strainer 19 is connected to a refrigerant pipe 13E on the refrigerant outlet side of the radiator 4. In addition, the refrigerant pipe 13E branches to a refrigerant pipe 13J and a refrigerant pipe 13F in front of the outdoor expansion valve 6 (refrigerant upstream side). One branched refrigerant pipe 13J is connected to the refrigerant inlet side of the outdoor heat exchanger 7 via the outdoor expansion valve 6. Further, the other branched refrigerant pipe 13F communicates and connects with the refrigerant pipe 13B at a position which is on the refrigerant downstream side of the check valve 18 and on the refrigerant upstream side of the solenoid valve 35 (indoor expansion valve 3) via a solenoid valve 22 (for dehumidification) as an open/close valve that is opened during dehumidification.

Thus, the refrigerant pipe 13F is connected in parallel with a series circuit of the outdoor expansion valve 6, the outdoor heat exchanger 7, and the check valve 18 and serves as a bypass circuit which bypasses the outdoor expansion valve 6, the outdoor heat exchanger 7, and the check valve 18.

Further, in the air flow passage 3 on the air upstream side of the heat absorber 9, respective suction ports such as an outdoor air suction port and an indoor air suction port are formed (represented by a suction port 25 in FIG. 1). In the suction port 25, an air inlet changing damper 26 is disposed to change the air to be introduced into the air flow passage 3 to indoor air which is air of the vehicle interior (indoor air circulation) and outdoor air which is air outside the vehicle interior (outdoor air introduction). In addition, an indoor blower (blower fan) 27 to supply the introduced indoor or outdoor air to the air flow passage 3 is provided on the air downstream side of the air inlet changing damper 26.

Incidentally, the air inlet changing damper 26 of the embodiment is constituted so that the ratio of the indoor air of the air (outdoor and indoor air) flowing into the heat absorber 9 in the air flow passage 3 can be adjusted between 0% and 100% by opening and closing the outdoor air suction port and the indoor air suction port of the suction port 25 at an arbitrary ratio (the ratio of the outdoor air can also be adjusted between 100% and 0%).

In addition, in the air flow passage 3 on the leeward side (air downstream side) of the radiator 4, an auxiliary heater 23 as an auxiliary heating device constituted of a PTC heater (electric heater) is provided in the embodiment and is capable of heating air supplied to the vehicle interior through the radiator 4. Further, in the air flow passage 3 on the air upstream side of the radiator 4, there is provided an air mix damper 28 to adjust a ratio at which the air in the air flow passage 3 (the indoor or outdoor air) flowing into the air flow passage 3 and passed through the heat absorber 9 is to be passed through the radiator 4 and the auxiliary heater 23.

Furthermore, in the air flow passage 3 on the air downstream side of the radiator 4, there is formed each outlet (represented by an outlet 29 in FIG. 1) of FOOT (foot), VENT (vent) or DEF (defroster). In the outlet 29, an air outlet changing damper 31 is provided to execute changing control of blowing of the air from each outlet described above.

In addition, the vehicle air conditioning device 1 is provided with a device temperature adjusting device 61 as the in-vehicle device temperature adjusting device of the present invention, which circulates a heat medium through the battery 55 to adjust the temperature of the battery 55. The device temperature adjusting device 61 of the embodiment includes a circulating pump 62 as a circulation device to circulate the heat medium through the battery 55, a refrigerant-heat medium heat exchanger 64 as a heat-absorbing heat exchanger, and a heat medium heating heater 63 as a heating device. Those and the battery 55 are annularly connected by a heat medium pipe 66. These circulating pump 62 and heat medium pipe 66 of the device temperature adjusting device 61 constitute a heat medium circulating device that circulates the heat medium cooled by the refrigerant-heat medium heat exchanger 64 to the battery 55 (in-vehicle device).

In the case of the embodiment, an inlet of a heat medium flow passage 64A of the refrigerant-heat medium heat exchanger 64 is connected to a discharge side of the circulating pump 62. An outlet of the heat medium flow passage 64A is connected to an inlet of the heat medium heating heater 63. An outlet of the heat medium heating heater 63 is connected to an inlet of the battery 55, and an outlet of the battery 55 is connected to a suction side of the circulating pump 62.

As the heat medium used in the device temperature adjusting device 61, for example, water, a refrigerant such as HFO-1234yf, liquid such as a coolant or the like, or gas such as air or the like can be adopted. Incidentally, in the embodiment, water is used as the heat medium. Also, the heat medium heating heater 63 is constituted of an electric heater such as a PTC heater or the like. Further, it is assumed that, for example, a jacket structure capable of circulating the heat medium in a heat exchange relation with the battery 55 is applied around the battery 55.

Then, when the circulating pump 62 is operated, the heat medium discharged from the circulating pump 62 flows into the heat medium flow passage 64A of the refrigerant-heat medium heat exchanger 64. The heat medium flowing out from the heat medium flow passage 64A of the refrigerant-heat medium heat exchanger 64 reaches the heat medium heating heater 63. When the heat medium heating heater 63 generates heat, the heat medium is heated thereat and then reaches the battery 55. The heat medium performs heat exchange with the battery 55 thereat. Then, the heat medium having performed heat exchange with the battery 55 is sucked into the circulating pump 62 to be circulated in the heat medium pipe 66.

On the other hand, one end of a branch pipe 67 as a branch circuit is connected to the refrigerant pipe 13B located on a refrigerant downstream side of a connecting part of the refrigerant pipe 13F and the refrigerant pipe 13B in the refrigerant circuit R and on a refrigerant upstream side of the solenoid valve 35. In the embodiment, the branch pipe 67 is provided with a solenoid valve 69 (chiller) as a valve device and an auxiliary expansion valve 68 constituted of a mechanical expansion valve sequentially. The auxiliary expansion valve 68 decompresses and expands the refrigerant flowing into an after-mentioned refrigerant flow passage 64B of the refrigerant-heat medium heat exchanger 64 and adjusts a superheat degree of the refrigerant in the refrigerant flow passage 64B of the refrigerant-heat medium heat exchanger 64.

Then, the other end of the branch pipe 67 is connected to the refrigerant flow passage 64B of the refrigerant-heat medium heat exchanger 64. One end of a refrigerant pipe 71 is connected to an outlet of the refrigerant flow passage 64B, and the other end of the refrigerant pipe 71 is connected to the refrigerant pipe 13K on the refrigerant downstream side from the accumulator 12. Then, the refrigerant circuit R of the vehicle air conditioning device 1 having these auxiliary expansion valve 68, solenoid valve 69, refrigerant flow passage 64B of refrigerant-heat medium heat exchanger 64, branch pipe 67, refrigerant pipe 71, compressor 2, outdoor heat exchanger 7, etc. also constitutes the refrigerant circuit R of the device temperature adjusting device 61 (in-vehicle device temperature adjusting device of the present invention).

When the solenoid valve 69 is opened, the refrigerant (some or all refrigerant) flowing out from the outdoor heat exchanger 7 flows into the branch pipe 67 and is decompressed by the auxiliary expansion valve 68 via the solenoid valve 69. Thereafter, the refrigerant flows into the refrigerant flow passage 64B of the refrigerant-heat medium heat exchanger 64 to evaporate there. The refrigerant absorbs heat from the heat medium flowing through the heat medium flow passage 64A in the process of flowing through the refrigerant flow passage 64B, followed by being sucked into the compressor 2 via the refrigerant pipe 71 and the refrigerant pipe 13K.

Figure 2:
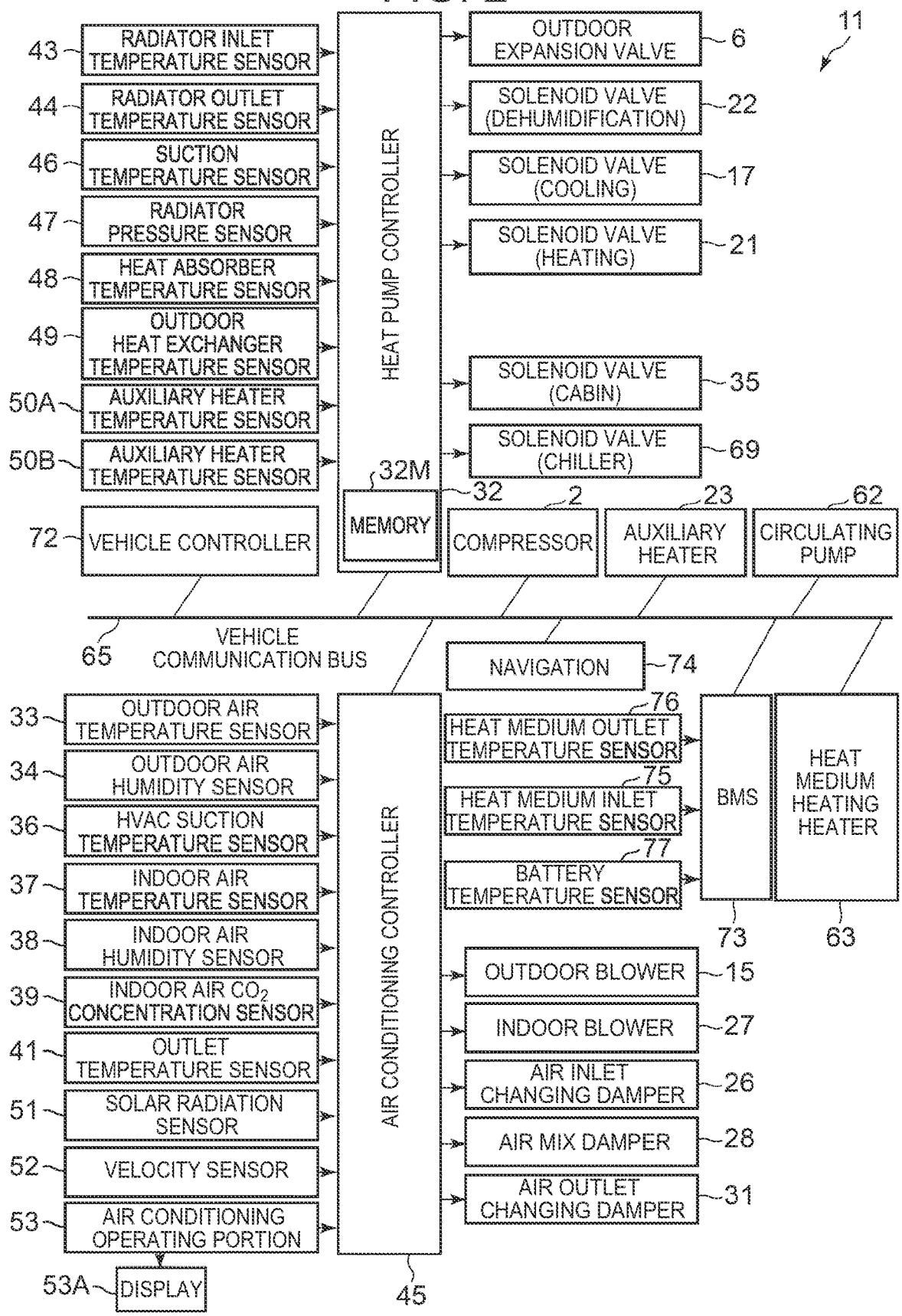
FIG. 2 is a block diagram of an electric circuit of a control device in the vehicle air conditioning device of FIG. 1.

Next, FIG. 2 shows a block diagram of the control device 11 of the vehicle air conditioning device 1 of the embodiment. The control device 11 also constitutes the device temperature adjusting device 61 of the present invention. The control device 11 is constituted of an air conditioning controller 45 and a heat pump controller 32, each of which is constituted of a microcomputer that is an example of a computer including a processor. These are connected to a vehicle communication bus 65 that constitutes a CAN (Controller Area Network) or a LIN (Local Interconnect Network). Further, the compressor 2 and the auxiliary heater 23, and the circulating pump 62 and the heat medium heating heater 63 are also connected to the vehicle communication bus 65. These air conditioning controller 45, heat pump controller 32, compressor 2, auxiliary heater 23, circulating pump 62 and heat medium heating heater 63 are configured to transmit and receive data via the vehicle communication bus 65.

Further, a vehicle controller 72 (ECU) that controls the entire vehicle including running, a battery controller (BMS: Battery Management System) 73 that controls the charging and discharging of the battery 55, and a GPS navigation device 74 are connected to the vehicle communication bus 65. The vehicle controller 72, the battery controller 73, and the GPS navigation device 74 are also constituted of a microcomputer that is an example of a computer including a processor. The air conditioning controller 45 and the heat pump controller 32 that constitute the control device 11 are configured to transmit and receive information (data) to and from these vehicle controller 72, battery controller 73, and GPS navigation device 74 visa the vehicle communication bus 65.

The air conditioning controller 45 is a host controller that controls vehicle interior air conditioning of the vehicle. An input of the air conditioning controller 45 is connected to respective outputs of an outdoor air temperature sensor 33 which detects an outdoor air temperature Tam of the vehicle, an outdoor air humidity sensor 34 which detects an outdoor air humidity, an HVAC suction temperature sensor 36 which detects a temperature of the air to be sucked from the suction port 25 to the air flow passage 3 and flow into the heat absorber 9, an indoor air temperature sensor 37 which detects a temperature of the air of the vehicle interior (the indoor air), an indoor air humidity sensor 38 which detects a humidity of the air of the vehicle interior, an indoor air $CO_2$ concentration sensor 39 which detects a carbon dioxide concentration of the vehicle interior, an outlet temperature sensor 41 which detects a temperature of the air to be blown out to the vehicle interior, a solar radiation sensor 51 of, e.g., a photo sensor system to detect a solar radiation amount into the vehicle interior, and a velocity sensor 52 to detect a moving speed (a velocity) of the vehicle, and an air conditioning operating portion 53 to perform air conditioning setting operations of the vehicle interior such as the changing of a predetermined temperature and operation modes in the vehicle interior, and the display of information. Incidentally, 53A in the figure is a display which serves as a display output device provided in the air conditioning operating portion 53.

Further, the outdoor blower 15, the indoor blower (the blower fan) 27, the air inlet changing damper 26, the air mix damper 28, and the air outlet changing damper 31 are connected to an output of the air conditioning controller 45. They are controlled by the air conditioning controller 45.

The heat pump controller 32 is a controller that mainly controls the refrigerant circuit R. An input of the heat pump controller 32 is connected with respective outputs of a radiator inlet temperature sensor 43 that detects a refrigerant inlet temperature Tcxin (also being a discharge refrigerant temperature of the compressor 2) of the radiator 4, a radiator outlet temperature sensor 44 that detects a refrigerant outlet temperature Tci of the radiator 4, a suction temperature sensor 46, that detects a suction refrigerant temperature Ts of the compressor 2, a radiator pressure sensor 47 that detects refrigerant pressure (the pressure of the radiator 4: radiator pressure Pci) on the refrigerant outlet side of the radiator 4, a heat absorber temperature sensor 48 that detects a temperature (a temperature of the heat absorber 9 itself or a temperature of air (to be cooled) immediately after being cooled by the heat absorber 9: hereinafter heat absorber temperature Te) of the heat absorber 9, an outdoor heat exchanger temperature sensor 49 that detects a refrigerant temperature (a refrigerant evaporation temperature of the outdoor heat exchanger 7: outdoor heat exchanger temperature TXO) at the outlet of the outdoor heat exchanger 7, and auxiliary heater temperature sensors 50A (driver's seat side) and 50B (passenger seat side) that detect the temperature of the auxiliary heater 23.

Further, an output of the heat pump controller 32 is connected with the outdoor expansion valve 6, and the respective solenoid valves of the solenoid valve 22 (for dehumidification), the solenoid valve 17 (for cooling), the solenoid valve 21 (for heating), the solenoid valve 35 (for cabin), and the solenoid valve 69 (for chiller). They are controlled by the heat pump controller 32. Incidentally, each of the compressor 2, the auxiliary heater 23, the circulating pump 62, and the heat medium heating heater 63 has a controller built therein. In the embodiment, the controllers of the compressor 2, the auxiliary heater 23, the circulating pump 62, and the heat medium heating heater 63 perform transmission/reception of data to and from the heat pump controller 32 via the vehicle communication bus 65 and are controlled by the heat pump controller 32. Incidentally, 32M is a memory (storage device) included in the heat pump controller 32.

Incidentally, the circulating pump 62 and the heat medium heating heater 63 that constitute the device temperature adjusting device 61 may be controlled by the battery controller 73. Further, the battery controller 73 is connected with outputs of a heat medium inlet temperature sensor 75 that detects a temperature (a heat medium inlet temperature Twin: an index indicative of the temperature of the battery 55 (in-vehicle device)) of the heat medium on the inlet side of the heat medium flow passage 64A of the refrigerant-heat medium heat exchanger 64 in the device temperature adjusting device 61, a heat medium outlet temperature sensor 76 that detects a temperature (a heat medium temperature Tw: an index indicative of the temperature of the battery 55) of the heat medium on the outlet side of the heat medium flow passage 64A of the refrigerant-heat medium heat exchanger 64, and a battery temperature sensor 77 that detects a temperature (hereinafter a battery temperature Tcell: this is also an index indicative of the temperature of the battery 55) of the battery 55.

Then, in the embodiment, in addition to a charge rate SOC of the battery 55, the heat medium temperature Tw, the heat medium inlet temperature Twin, the battery temperature Tcell, and a deterioration state SOH of the battery 55, information on the battery 55 (information about a discharge depth DoD, cycle deterioration, storage deterioration, the battery being in charge, a charging completion time, a remaining charging time, etc.) is transmitted from the battery controller 73 to the air conditioning controller 45 and the vehicle controller 72 via the vehicle communication bus 65.

The heat pump controller 32 and the air conditioning controller 45 transmit and receive data to and from each other via the vehicle communication bus 65, and control each device based on the output of each sensor and the setting input by the air conditioning operating portion 53. However, in the embodiment in this case, an air volume Ga (calculated by the air conditioning controller 45) of the air flowing in the outdoor air temperature sensor 33, the outdoor air humidity sensor 34, the HVAC suction temperature sensor 36, the indoor air temperature sensor 37, the indoor air humidity sensor 38, the indoor air $CO_2$ concentration sensor 39, the outlet temperature sensor 41, the solar radiation sensor 51, the velocity sensor 52, and the air flow passage 3 and circulating in the air flow passage 3, an air volume ratio SW (calculated by the air conditioning controller 45) by the air mix damper 28, a voltage (BLV) of the indoor blower 27, each information (information on the heat medium temperature Tw, heat medium inlet temperature Twin, battery charge rate SOC, battery temperature Tcell, battery deterioration state SOH, etc.) from the battery controller 73 described above, information from the GPS navigation device 74, and information input to the air conditioning operating portion 53 are transmitted via the vehicle communication bus 65 from the air conditioning controller 45 to the heat pump controller 32, and are made to be subjected to control by the heat pump controller 32.

Further, the heat pump controller 32 also transmits data (information) regarding the control of the refrigerant circuit R and the device temperature adjusting device 61 and information output to the air conditioning operating portion 53 to the air conditioning controller 45 via the vehicle communication bus 65. Incidentally, the air volume ratio SW by the air mix damper 28 described above is calculated by the air conditioning controller 45 in the range of $0 \leq SW \leq 1$. Then, when SW=1, all of the air that has passed through the heat absorber 9 is ventilated through the radiator 4 and the auxiliary heater 23 by the air mix damper 28.

Figure 3:
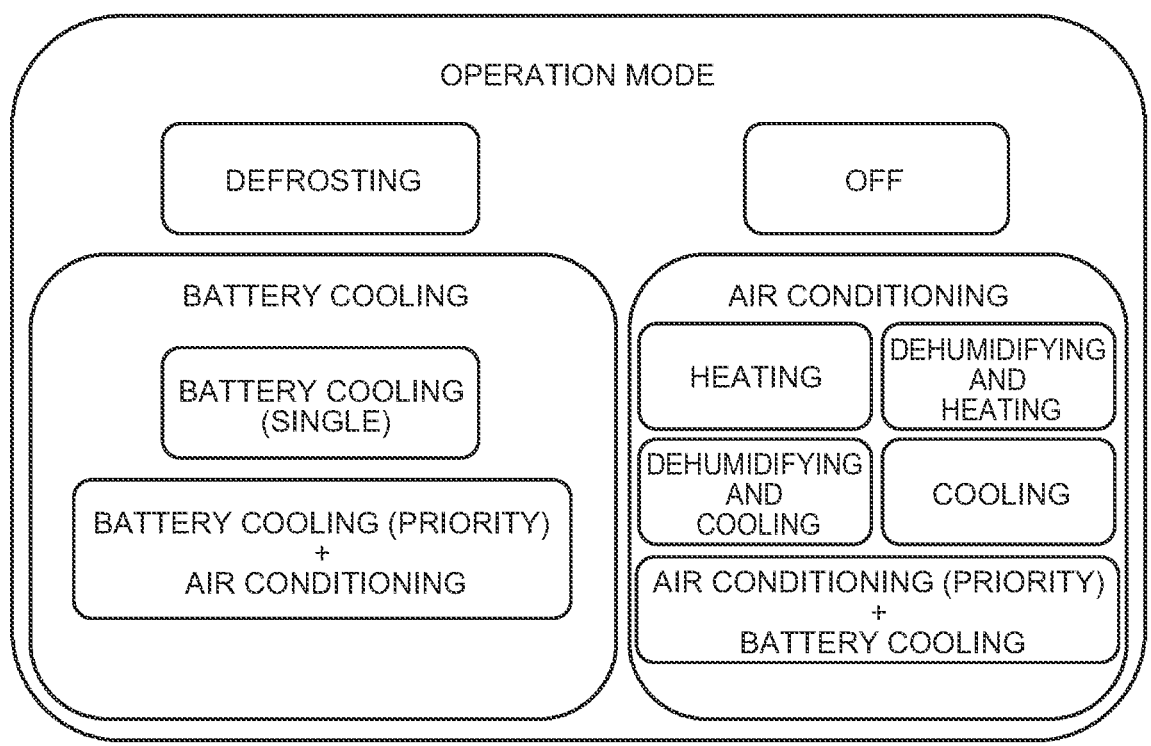
FIG. 3 is a diagram describing an operation mode executed by the control device of FIG. 2.

An operation of the vehicle air conditioning device 1 of the embodiment will next be described in the above constitution. In the embodiment, the control device 11 (the air conditioning controller 45 and the heat pump controller 32) changes and executes the respective air conditioning operations of the heating mode, the dehumidifying and heating mode, the dehumidifying and cooling mode, the cooling mode, and the air conditioning (priority)+battery cooling mode, the respective battery cooling operations of the battery cooling (priority)+air conditioning mode and the battery cooling (single) mode, and the defrosting mode. These are shown in FIG. 3.

Of these, the air conditioning operations of the heating mode, the dehumidifying and heating mode, the dehumidifying and cooling mode, the cooling mode, and the air conditioning (priority)+battery cooling mode are executed in the embodiment where the battery 55 is not charged, the ignition (IGN) of the vehicle is turned ON, and an air conditioning switch of the air conditioning operating portion 53 is turned ON. However, during remote operation (pre-air conditioning or the like), the air conditioning operation is executed even when the ignition is OFF.

Also, even while the battery 55 is being charged, the air conditioning operation is executed when there is no battery cooling request and the air conditioning switch is turned ON. On the other hand, the respective battery cooling operations of the battery cooling (priority)+air conditioning mode and the battery cooling (single) mode are executed when a plug for the quick charger (external power supply) is connected to charge the battery 55, for example. However, when the air conditioning switch is OFF and the battery cooling request is made (during running at a high outdoor air temperature or the like) even besides charging the battery 55, the battery cooling (single) mode is executed.

Further, in the embodiment, when the ignition is turned ON, or when the battery 55 is being charged even when the ignition is turned OFF, the heat pump controller 32 operates the circulating pump 62 of the device temperature adjusting device 61 to circulate the heat medium in the heat medium pipe 66 as indicated by broken lines in FIGS. 4 to 8. In addition, although not shown in FIG. 3, the heat pump controller 32 of the embodiment also executes a battery heating mode for heating the battery 55 by causing the heat medium heating heater 63 of the device temperature adjusting device 61 to generate heat.

(1) Heating Mode

Figure 4:
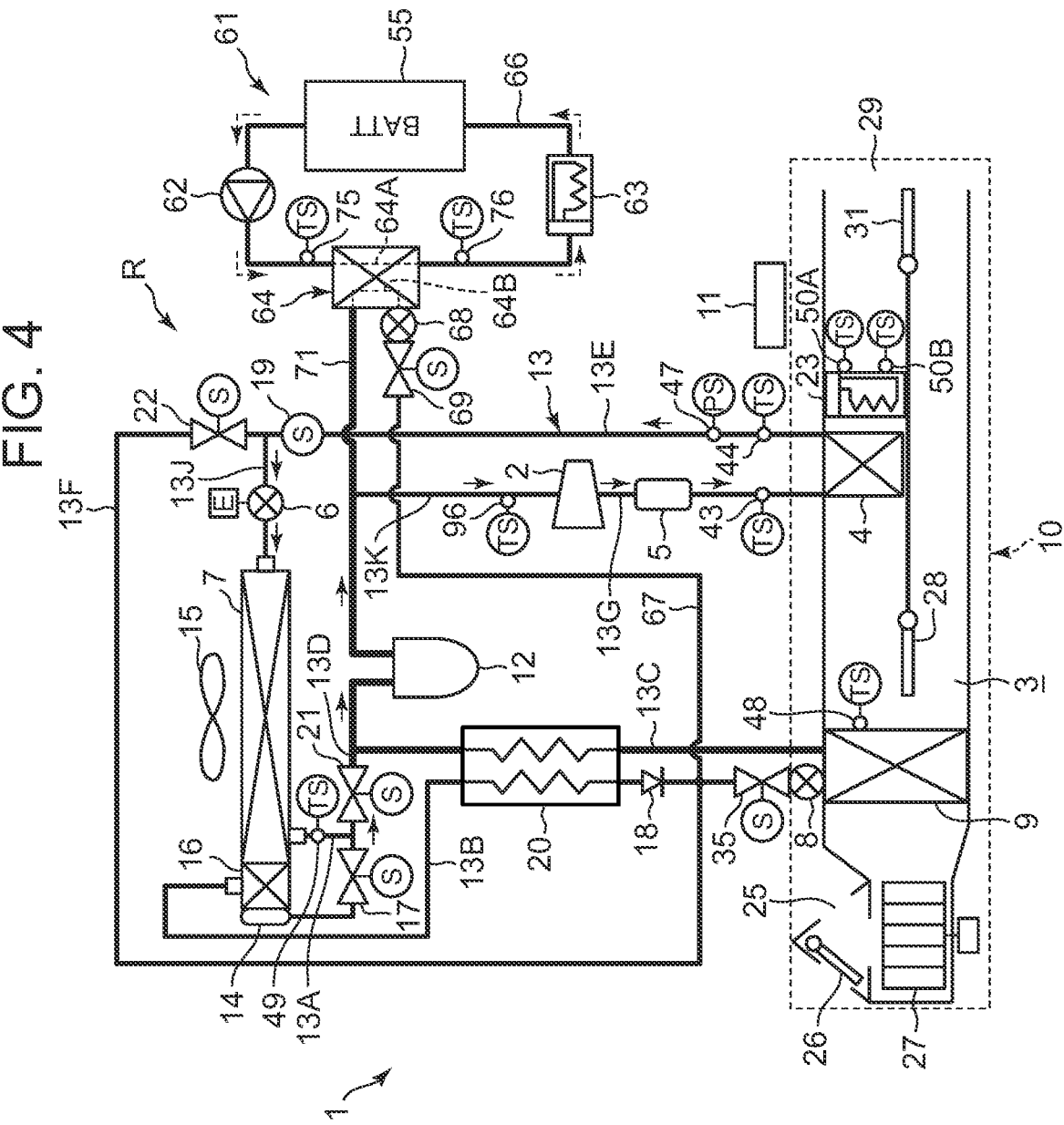
FIG. 4 is a constitutional diagram of the vehicle air conditioning device describing a heating mode and a defrosting mode by a heat pump controller of the control device of FIG. 2.

First, the heating mode will be described with reference to FIG. 4. Incidentally, the control of each device is executed by the cooperation of the heat pump controller 32 and the air conditioning controller 45, but in the following description, the heat pump controller 32 will be taken as a control main body and will be briefly described. FIG. 4 shows how the refrigerant flows in the refrigerant circuit R in the heating mode (solid line arrows).

When the heating mode is selected by the heat pump controller 32 (auto mode) or the manual air conditioning setting operation (manual mode) to the air conditioning operating portion 53 of the air conditioning controller 45, the heat pump controller 32 opens the solenoid valve 21 and closes the solenoid valve 17, the solenoid valve 22, the solenoid valve 35, and the solenoid valve 69. Then, the compressor 2 and the respective blowers 15 and 27 are operated, and the air mix damper 28 holds a state of adjusting a ratio at which the air blown from the indoor blower 27 is to be passed through the radiator 4 and the auxiliary heater 23.

Consequently, a high-temperature high-pressure gas refrigerant discharged from the compressor 2 flows into the radiator 4. Since the air in the air flow passage 3 passes through the radiator 4, the air in the air flow passage 3 is heated by exchanging heat with the high-temperature refrigerant in the radiator 4. On the other hand, the refrigerant in the radiator 4 has the heat taken by the air and is cooled to condense and liquefy.

The refrigerant liquefied in the radiator 4 flows out from the radiator 4 and then flows through the refrigerant pipes 13E and 13J to reach the outdoor expansion valve 6. The refrigerant flowing into the outdoor expansion valve 6 is decompressed therein, and then flows into the outdoor heat exchanger 7. The refrigerant flowing into the outdoor heat exchanger 7 evaporates, and the heat is pumped up from the outdoor air passed by running or the outdoor blower 15 (heat absorption). That is, the refrigerant circuit R functions as a heat pump. Then, the low-temperature refrigerant flowing out from the outdoor heat exchanger 7 passes through the refrigerant pipe 13A and the refrigerant pipe 13D, and the solenoid valve 21 to reach the refrigerant pipe 13C, and further flows into the accumulator 12 through the refrigerant pipe 13C to perform gas-liquid separation thereat. Then, the gas refrigerant is sucked into the compressor 2 from the refrigerant pipe 13K, thereby repeating this circulation. The air heated in the radiator 4 is blown out from the outlet 29, thereby performing the heating of the vehicle interior.

The heat pump controller 32 calculates target radiator pressure PCO from a target heater temperature TCO (a target temperature of the radiator 4) calculated from, a target outlet temperature TAO to be described later, which is a target temperature (a target value of the temperature of the air blown into the vehicle interior) of the air blown into the vehicle interior. The heat pump controller 32 controls the number of revolutions NC of the compressor 2, based on the target radiator pressure PCO and the radiator pressure Pci (high pressure of the refrigerant circuit R) detected by the radiator pressure sensor 47, and controls the valve position of the outdoor expansion valve 6 based on the refrigerant outlet temperature Tci of the radiator 4 detected by the radiator outlet temperature sensor 44 and the radiator pressure Pci detected by the radiator pressure sensor 47 to control the degree of supercooling of the refrigerant at the outlet of the radiator 4.

Further, when the heating capacity (heating capability) by the radiator 4 is insufficient with respect to the required heating capacity, the neat pump controller 32 supplements this shortage with the heat generated by the auxiliary heater 23. Consequently, the vehicle interior is heated without any trouble even at a low outdoor air temperature, etc.

(2) Dehumidifying and Heating Mode

Figure 5:
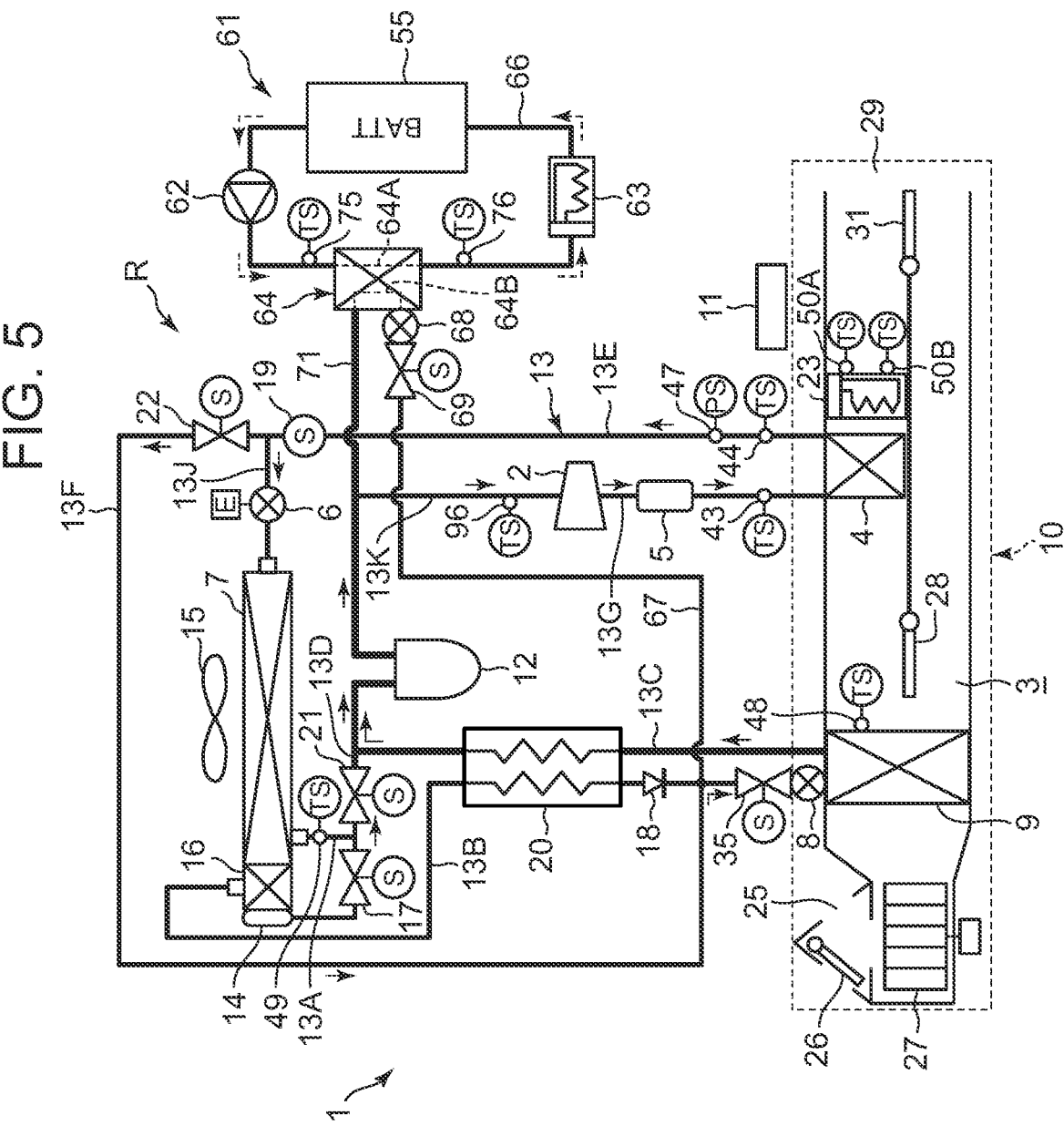
FIG. 5 is a constitutional diagram of the vehicle air conditioning device describing a dehumidifying and heating mode by the heat pump controller of the control device of FIG. 2.

Next, the dehumidifying and heating mode will be described with reference to FIG. 5. FIG. 5 shows how the refrigerant flows in the refrigerant circuit R in the dehumidifying and heating mode (solid line arrows). In the dehumidifying and heating mode, the heat pump controller 32 opens the solenoid valve 21, the solenoid valve 22, and the solenoid valve 35, and closes the solenoid valve 17 and the solenoid valve 69. Then, the compressor 2 and the respective blowers 15 and 27 are operated, and the air mix damper 28 holds a state of adjusting a ratio at which the air blown from the indoor blower 27 is to be passed through the radiator 4 and the auxiliary heater 23.

Thus, a high-temperature high-pressure gas refrigerant discharged from the compressor 2 flows into the radiator 4. Since the air in the air flow passage 3 passes through the radiator 4, the air in the air flow passage 3 is heated by exchanging heat with the high-temperature refrigerant in the radiator 4. On the other hand, the refrigerant in the radiator 4 has the heat taken by the air and is cooled to condense and liquefy.

The refrigerant liquefied in the radiator 4 flows out from the radiator 4 and then a part thereof flows into the refrigerant pipe 13J through the refrigerant pipe 13E to reach the outdoor expansion valve 6. The refrigerant flowing into the outdoor expansion valve 6 is decompressed therein, and then flows into the outdoor heat exchanger 7. The refrigerant flowing into the outdoor heat exchanger 7 evaporates, and the heat is pumped up from the outdoor air passed by running or the outdoor blower 15 (heat absorption). Then, the low-temperature refrigerant flowing out from the outdoor heat exchanger 7 reaches the refrigerant pipe 13C through the refrigerant pipe 13A and the refrigerant pipe 13D, and the solenoid valve 21 and flows into the accumulator 12 through the refrigerant pipe 13C to perform gas-liquid separation thereat. The gas refrigerant is then sucked into the compressor 2 from the refrigerant pipe 13K, thereby repeating this circulation.

On the other hand, the residual condensed refrigerant flowing into the refrigerant pipe 13E through the radiator 4 is distributed, and the distributed refrigerant flows into the refrigerant pipe 13F through the solenoid valve 22 to reach the refrigerant pipe 13B. Next, the refrigerant reaches the indoor expansion valve 8 through the solenoid valve 35 and is decompressed by the indoor expansion valve 8, and then flows into the heat absorber 9 to evaporate. The water in the air blown out from the indoor blower 27 coagulates to adhere to the heat absorber 9 by the heat absorbing operation of the refrigerant which occurs in the heat absorber 9 at this time. Hence, the air is cooled and dehumidified.

The refrigerant evaporated in the heat absorber 9 flows out to the refrigerant pipe 13C and passes through the internal heat exchanger 20. Thereafter, the refrigerant joins the refrigerant (refrigerant from the outdoor heat exchanger 7) from the refrigerant pipe 13D, and then flows through the accumulator 12 to be sucked into the compressor 2 from the refrigerant pipe 13K, thereby repeating this circulation. The air dehumidified in the heat absorber 9 is reheated in the process of passing the radiator 4 and the auxiliary heater 23 (when heat is generated), thereby performing the dehumidifying and heating of the vehicle interior.

In the embodiment, the heat pump controller 32 controls the number of revolutions NC of the compressor 2 on the basis of the target radiator pressure PCO calculated from the target heater temperature TCO and the radiator pressure Pci (the high pressure of the refrigerant circuit R) detected by the radiator pressure sensor 47, or the heat pump controller 32 controls the number of revolutions NC of the compressor 2 on the basis of the temperature (the heat absorber temperature Te) of the heat absorber 9 which is detected by the heat absorber temperature sensor 48, and the target heat absorber temperature TEO being its target value. At this time, the heat pump controller 32 selects a smaller compressor target number of revolutions from compressor target numbers of revolutions obtained by either of calculations from the radiator pressure Pci and the heat absorber temperature Te to control the compressor 2. Further, the heat pump controller 32 controls the valve position of the outdoor expansion valve 6 based on the heat absorber temperature Te.

Further, when the heating capacity (heating capability) by the radiator 4 is insufficient with respect to the required heating capacity even in the dehumidifying and heating mode, the heat pump controller 32 supplements this shortage with the heat generated by the auxiliary heater 23. Consequently, the vehicle interior is dehumidified and heated without any trouble even at the low outdoor air temperature, etc.

(3) Dehumidifying and Cooling Mode

Figure 6:
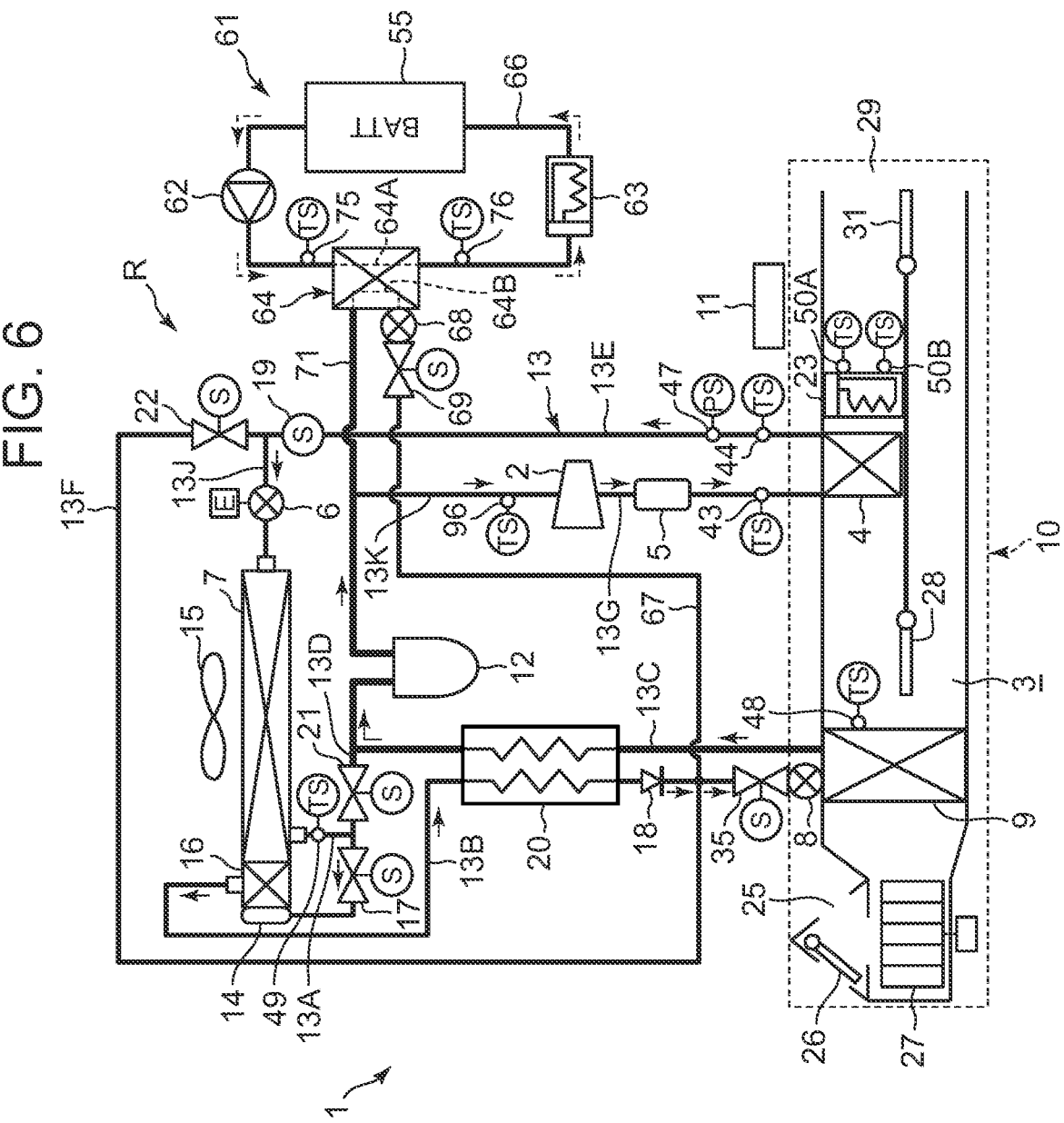
FIG. 6 is a constitutional diagram of the vehicle air conditioning device describing a dehumidifying and cooling mode and a cooling mode by the heat pump controller of the control device of FIG. 2.

Next, the dehumidifying and cooling mode will be described with reference to FIG. 6. FIG. 6 shows how the refrigerant flows in the refrigerant circuit R in the dehumidifying and cooling mode (solid line arrows). In the dehumidifying and cooling mode, the heat pump controller 32 opens the solenoid valve 17 and the solenoid valve 35, and closes the solenoid valve 21, the solenoid valve 22, and the solenoid valve 69. Then, the compressor 2 and the respective blowers 15 and 27 are operated, and the air mix damper 28 holds a state of adjusting a ratio at which the air blown from the indoor blower 27 is to be passed through the radiator 4 and the auxiliary heater 23.

Thus, a high-temperature high-pressure gas refrigerant discharged from the compressor 2 flows into the radiator 4. Since the air in the air flow passage 3 passes through the radiator 4, the air in the air flow passage 3 is heated by exchanging heat with the high-temperature refrigerant in the radiator 4. On the other hand, the refrigerant in the radiator 4 has the heat taken by the air and is cooled to condense and liquefy.

The refrigerant flowing out from the radiator 4 reaches the outdoor expansion valve 6 through the refrigerant pipes 13E and 13J, and flows through the outdoor expansion valve 6 controlled to slightly open (in the area of a large valve position) than in the heating mode and the dehumidifying and heating mode to flow into the outdoor heat exchanger 7. The refrigerant flowing into the outdoor heat exchanger 7 is cooled by the running therein or the outdoor air passed through the outdoor blower 15 to condense.

The refrigerant flowing out from the outdoor heat exchanger 7 flows into the refrigerant pipe 13B through the refrigerant pipe 13A, the solenoid valve 17, the receiver drier unit 14, and the supercooling unit 16 to reach the indoor expansion valve 8 through the internal heat exchanger 20, the check valve 18, and the solenoid valve 35.

The refrigerant is decompressed by the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled and dehumidified.

The refrigerant evaporated in the heat absorber 9 flows out into the refrigerant pipe 13C to pass through the internal heat exchanger 20 and then reaches the accumulator 12, and flows through the accumulator 12 to be sucked into the compressor 2 from the refrigerant pipe 13K, thereby repeating this circulation. The air cooled and dehumidified in the heat absorber 9 is reheated in the process of passing the radiator 4 and the auxiliary heater 23 (when heat is generated) (the heating capability is lower than when dehumidifying and heating), thereby performing the dehumidifying and heating of the vehicle interior.

The heat pump controller 32 controls, based on the temperature (the heat absorber temperature Te) of the heat absorber 9 which is detected by the heat absorber temperature sensor 48, and the target heat absorber temperature TEO being a target temperature (a target value of the heat absorber temperature Te) of the heat absorber 9, the number of revolutions NC of the compressor 2 to set the heat absorber temperature Te to the target heat absorber temperature TEO, and controls, based on the radiator pressure Pci (the high pressure of the refrigerant circuit R) detected by the radiator pressure sensor 47 and the target radiator pressure PCO (a target value of the radiator pressure Pci), the valve position of the outdoor expansion valve 6 to set the radiator pressure Pci to the target radiator pressure PCO, thereby obtaining a required amount of reheat (reheating amount) by the radiator 4.

Further, when the heating capacity (reheating capability) by the radiator 4 is insufficient with respect to the required heating capacity even in the dehumidifying and cooling mode, the heat pump controller 32 supplements this shortage with the heat generated by the auxiliary heater 23. Consequently, the vehicle interior is dehumidified and cooled without lowering the temperature of the vehicle interior too much.

(4) Cooling Mode

Next, the cooling mode will be described. The way of allowing the refrigerant to flow in the refrigerant circuit R in the cooling mode is similar to FIG. 6. That is, even in the cooling mode, the heat pump controller 32 opens the solenoid valve 17 and the solenoid valve 35, and closes the solenoid valve 21, the solenoid valve 22, and the solenoid valve 69. Then, the compressor 2 and the respective blowers 15 and 27 are operated, and the air mix damper 28 holds a state of adjusting a ratio at which the air blown from the indoor blower 27 is to be passed through the radiator 4 and the auxiliary heater 23. Incidentally, the auxiliary heater 23 is not energized.

Thus, the high-temperature high-pressure gas refrigerant discharged from the compressor 2 flows into the radiator 4. The air in the air flow passage 3 is passed through the radiator 4 but its ratio becomes small (because of only reheat (reheating) during the cooling). The refrigerant therefore almost only passes the radiator, and the refrigerant flowing out from the radiator 4 flows through the refrigerant pipe 13E to reach the refrigerant pipe 13J. Here, the outdoor expansion valve 6 is fully opened in the cooling mode. Accordingly, the refrigerant flows into the outdoor heat exchanger 7 as it is, where the refrigerant is cooled by the running therein or the outdoor air ventilated by the outdoor blower 15, to condense and liquefy.

The refrigerant flowing out from the outdoor heat exchanger 7 flows through the refrigerant pipe 13A, the solenoid valve 17, the receiver drier unit 14, and the super-cooling unit 16 to enter the refrigerant pipe 13B, and flows through the internal heat exchanger 20, the check valve 18, and the solenoid valve 35 to reach the indoor expansion valve 8. The refrigerant is decompressed in the indoor expansion valve 8 and then flows into the heat absorber 9 to evaporate. The air which is blown out from the indoor blower 27 and exchanges heat with the heat absorber 9 is cooled by the heat absorbing operation at this time.

The refrigerant evaporated in the heat absorber 9 flows out to the refrigerant pipe 13C to pass through the internal heat exchanger 20 and then reaches the accumulator 12, and flows through the refrigerant pipe 13K therefrom to be sucked into the compressor 2, thereby repeating this circulation. The air cooled in the heat absorber 9 is blown out from the outlet 29 to the vehicle interior, thereby performing the cooling of the vehicle interior. In this cooling mode, the heat pump controller 32 controls the number of revolutions NC of the compressor 2 on the basis of the temperature (the heat absorber temperature Te) of the heat absorber 9 which is detected by the heat absorber temperature sensor 48.

(5) Air Conditioning (Priority)+Battery Cooling Mode

Figure 7:
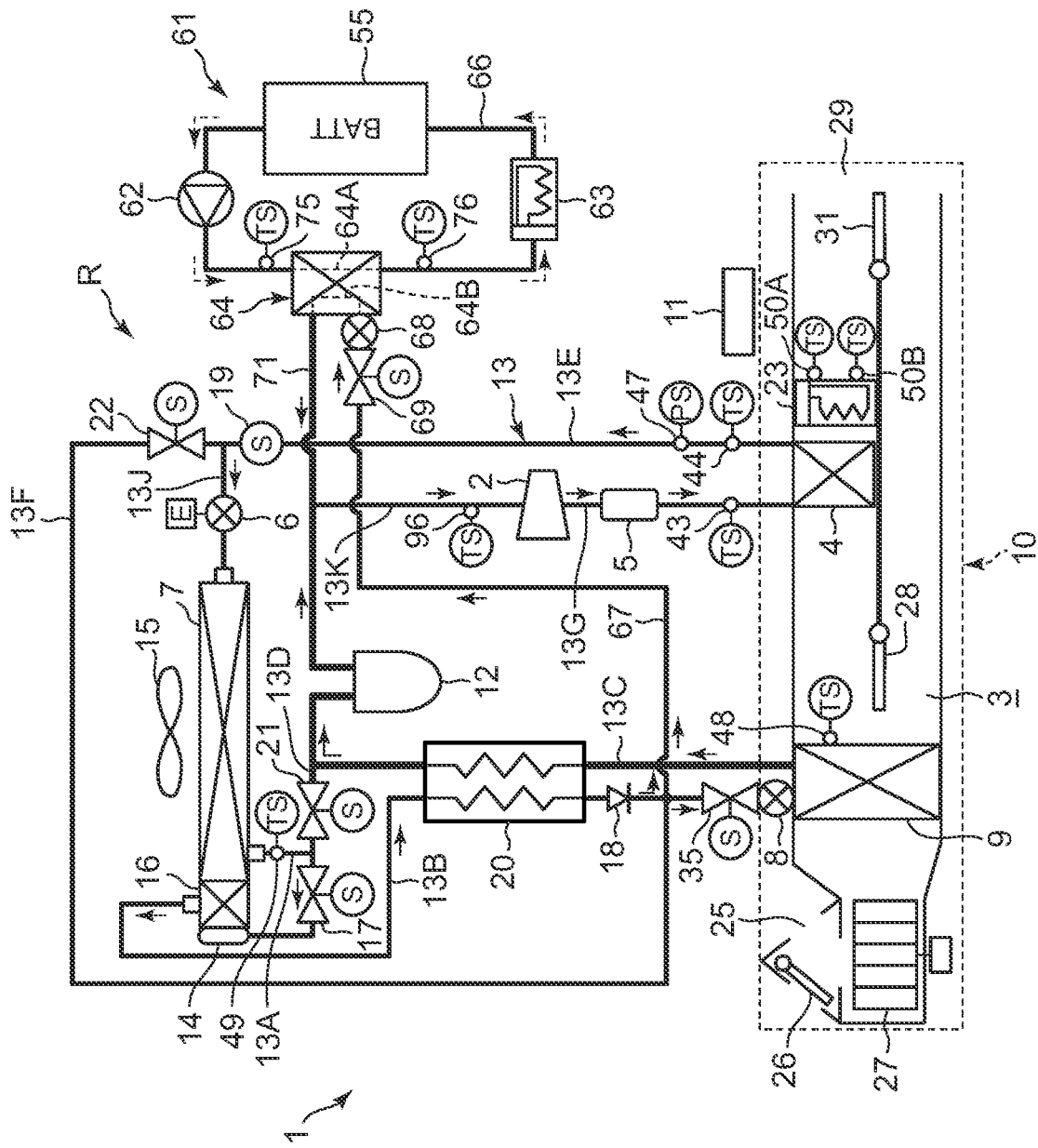
FIG. 7 is a constitutional diagram of the vehicle air conditioning device describing an air conditioning (priority)+battery cooling mode and a battery cooling (priority)+air conditioning mode by the heat pump controller of the control device of FIG. 2.

Next, the air conditioning (priority)+battery cooling mode will be described with reference to FIG. 7. FIG. 7 shows how the refrigerant flows in the refrigerant circuit R in the air conditioning (priority)+battery cooling mode (solid line arrows). In the air conditioning (priority)+battery cooling mode, the heat pump controller 32 opens the solenoid valve 17, the solenoid valve 35, and the solenoid valve 69, and closes the solenoid valve 21 and the solenoid valve 22.

Then, the compressor 2 and the respective blowers 15 and 27 are operated, and the air mix damper 28 holds a state of adjusting a ratio at which the air blown from the indoor blower 27 is to be passed through the radiator 4 and the auxiliary heater 23. Incidentally, in this operation mode, the auxiliary heater 23 is not energized. Further, the heat medium heating heater 63 is not energized either.

Thus, the high-temperature high-pressure gas refrigerant discharged from the compressor 2 flows into the radiator 4. The air in the air flow passage 3 is passed through the radiator 4 but its ratio becomes small (because of only reheat (reheating) during the cooling). The refrigerant therefore almost only passes the radiator here, and the refrigerant flowing out from the radiator 4 flows through the refrigerant pipe 13E to reach the refrigerant pipe 13J. Even in this air conditioning (priority)+battery cooling mode, the outdoor expansion valve 6 is fully opened, and hence, the refrigerant flows into the outdoor heat exchanger 7 as it is, in which the refrigerant is cooled by the running therein or the outdoor air ventilated by the outdoor blower 15, to condense and liquefy.

The refrigerant flowing out from the outdoor heat exchanger 7 flows through the refrigerant pipe 13A, the solenoid valve 17, the receiver drier unit 14, and the super-cooling unit 16 to enter the refrigerant pipe 13B. The refrigerant flowing into the refrigerant pipe 13B is distributed after passing through the internal heat exchanger 20 and the check valve 18, and the distributed one flows through the refrigerant pipe 13B as it is to reach the indoor expansion valve 8 through the solenoid valve 35. The refrigerant flowing into the indoor expansion valve 8 is decompressed therein and then flows into the heat absorber 9 to evaporate. The air which is blown out from the indoor blower 27 and exchanges heat with the heat absorber 9 is cooled by the heat absorbing operation at this time.

The refrigerant evaporated in the heat absorber 9 flows out to the refrigerant pipe 13C to pass through the internal heat exchanger 30 and then reaches the accumulator 12, and flows through the refrigerant pipe 13K therefrom to be sucked into the compressor 2, thereby repeating this circulation. The air cooled in the heat absorber 9 is blown out from the outlet 29 to the vehicle interior, thereby performing the cooling of the vehicle interior.

On the other hand, the residual of the refrigerant that has passed through the check valve 28 is shunted and flows into the branch pipe 67, and reaches the auxiliary expansion valve 68 via the solenoid valve 69. Here, after the refrigerant is decompressed, it flows into the refrigerant flow passage 64B of the refrigerant-heat medium heat exchanger 64 and evaporates there. At this time, it exerts an endothermic effect. The refrigerant evaporated in the refrigerant flow passage 64B reaches the refrigerant pipe 13K via the refrigerant pipe 71, and repeats circulation of the refrigerant sucked into the compressor 2 (indicated by a solid arrow in FIG. 7).

On the other hand, since the circulating pump 62 is in operation, the heat Medium discharged from the circulating pump 62 reaches the heat medium flow passage 64A of the refrigerant-heat medium heat exchanger 64 in the heat medium pipe 66, where it exchanges heat with the refrigerant that evaporates within the refrigerant flow passage 64B and absorbs heat to cool the heat medium. The heat medium exiting the heat medium flow passage 64A of the refrigerant-heat medium heat exchanger 64 reaches the heat medium heating heater 63. However, since the heat medium heating heater 63 does not generate heat in this operation mode, the heat medium passes through as it is and reaches the battery 55, which exchanges heat with the battery 55. Consequently, the battery 55 is cooled, and the heat medium after having cooled the battery 55 repeats circulation thereof sucked into the circulating pump 62 (indicated by a broken line arrow in FIG. 7).

Figure 10:
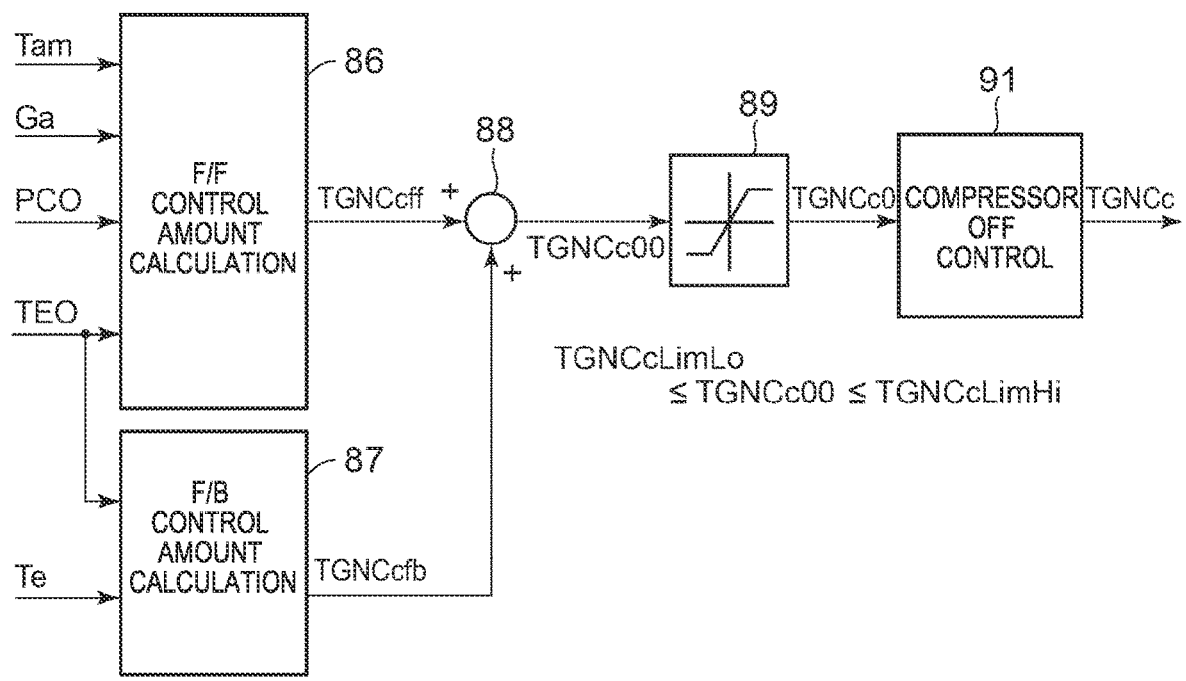
FIG. 10 is another control block diagram regarding compressor control of the heat pump controller of the control device in FIG. 2.

In this air conditioning (priority)+battery cooling mode, the heat pump controller 32 keeps the solenoid valve 35 open, and controls the number of revolutions NC of the compressor 2 to be described later as shown in FIG. 10 on the basis of the temperature of the heat absorber 9 (heat absorber temperature Te) detected by the heat absorber temperature sensor 48. Further, in the embodiment, the solenoid valve 69 is controlled to open and close as follows based on the temperature of the heat medium (heat medium temperature Tw: transmitted from the battery controller 73) detected by the heat medium outlet temperature sensor 76.

Figure 11:
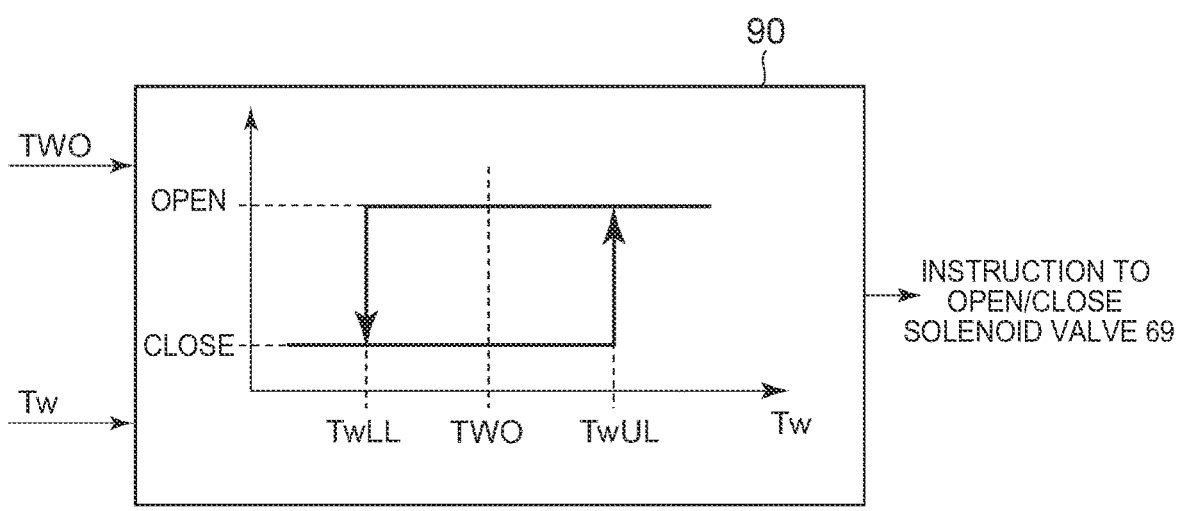
FIG. 11 is a block diagram describing control of a solenoid valve 69 in the air conditioning (priority)+battery cooling mode by the heat pump controller of the control device of FIG. 2.

FIG. 11 shows a block diagram of opening/closing control of the solenoid valve 69 in the air conditioning (priority)+battery cooling mode. The heat medium temperature Tw detected by the heat medium outlet temperature sensor 76 and the target heat medium temperature TWO as a target value of the heat medium temperature Tw are input to a battery solenoid valve control unit 90 of the heat pump controller 32. Then, the solenoid valve control unit 90 for the battery has a predetermined temperature difference above and below the target heat medium temperature TWO, sets a control upper limit value TwUL and a control lower limit value TwLL, and opens the solenoid valve 69 (instruction to open the solenoid valve 69) where the heat medium temperature Tw becomes high due to heat generation of the battery 55 or the like from the state in which the solenoid valve 69 is closed, and rises to the control upper limit value TwUL (when it exceeds the control upper limit value TwUL or when the control upper limit value TwUL or more is reached. The same applies hereinafter). Consequently, the refrigerant flows into the refrigerant flow passage 64B of the refrigerant-heat medium heat exchanger 64 and evaporates to cool the heat medium flowing through the heat medium flow passage 64A. Therefore, the battery 55 is cooled by the cooled heat medium.

Thereafter, when the heat medium temperature Tw drops to the control lower limit value TwLL (when it falls below the control lower limit value TwLL, or when it becomes the control lower limit value TwLL or less. The same applies hereinafter), the solenoid valve 69 is closed (instruction to close the solenoid valve 69). After that, the solenoid valve 69 is repeatedly opened and closed in this way to control the heat medium temperature Tw to the target heat medium temperature TWO and cool the battery 55 while giving priority to cooling of the interior of the vehicle.

(6) Switching of Air Conditioning Operation

The heat pump controller 32 calculates the target outlet temperature TAO described above from the following equation (I). This target outlet temperature TAO is a target value of the temperature of the air blown into the vehicle interior from the outlet 29.

$$TAO=(Tset-Tin)\times K+Tbal(f(Tset,SUN,Tam)) \quad (I)$$

where Tset is a predetermined temperature of the vehicle interior which is set by the air conditioning operating portion 53, Tin is a temperature of the vehicle interior air which is detected by the indoor air temperature sensor 37, K is a coefficient, and Tbal is a balance value calculated from the predetermined temperature Tset, a solar radiation amount SUN detected by the solar radiation sensor 51, and the outdoor air temperature Tam detected by the outdoor air temperature sensor 33. Then, in general, the lower the outdoor air temperature Tam is, the higher the target outlet temperature TAO becomes, and the target outlet temperature TAO decreases as the outdoor air temperature Tam rises.

Then, the heat pump controller 32 selects any air conditioning operation from the above respective air conditioning operations on the basis of the outdoor air temperature Tam detected by the outdoor air temperature sensor 33 and the target outlet temperature TAO on startup. Further, after the startup, the heat pump controller selects and changes the above respective air conditioning operations in accordance with changes of operating conditions, environment conditions, and setting conditions such as the outdoor air temperature Tam, the target outlet temperature TAO, the heat medium temperature Tw, etc. For example, the transition from the cooling mode to the air conditioning (priority)+battery cooling mode is executed based on the input of the battery cooling request from the battery controller 73. In this case, the battery controller 73 outputs a battery cooling request when, for example, the heat medium temperature Tw or the battery temperature Tcell rises to a predetermined value or more, and transmits it to the heat pump controller 32 or the air conditioning controller 45.

(7) Battery Cooling (Priority)+Air Conditioning Mode

Next, the operation of the battery 55 during its charging will be described. For example, when the charging plug of the quick charger (external power source) is connected, and the battery 55 is being charged (these information is transmitted from the battery controller 73), the heat pump controller 32 executes the battery cooling (priority)+air conditioning mode where regardless of ON/OFF of the vehicle ignition (IGN), the battery cooling request is made and the air conditioning switch of the air conditioning operating portion 53 is turned ON. The way the refrigerant flows in the refrigerant circuit R in the battery cooling (priority)+air conditioning mode is similar to that in the air conditioning (priority)+battery cooling mode shown in FIG. 7.

Figure 12:
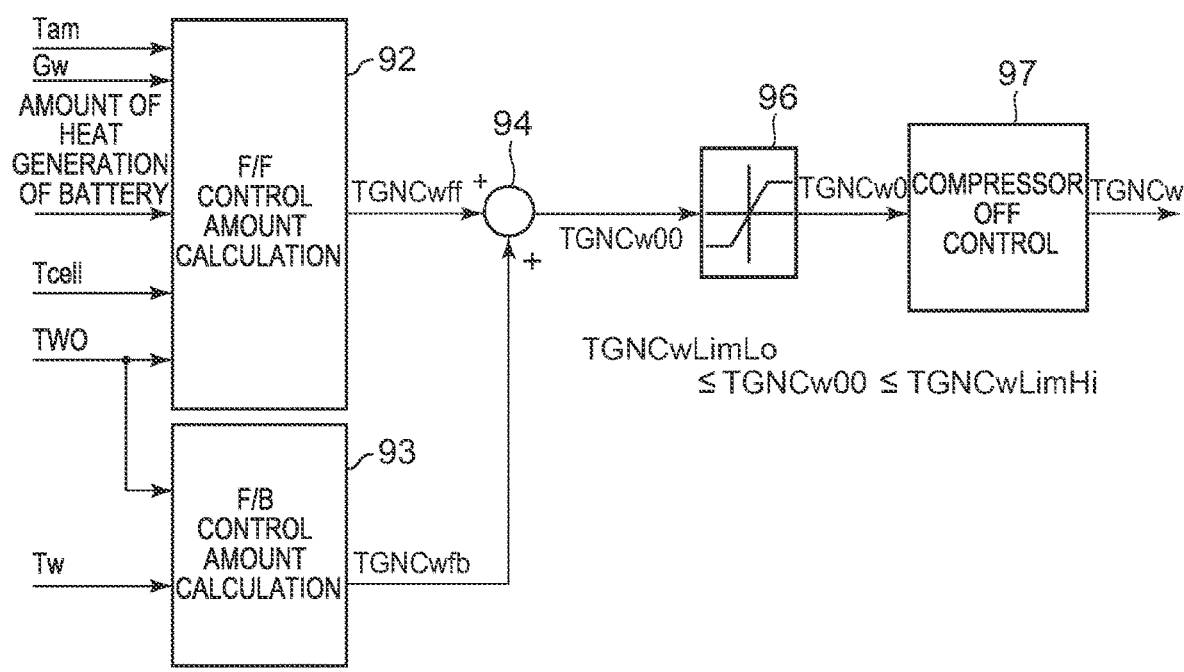
FIG. 12 is yet another control block diagram regarding compressor control of the heat pump controller of the control device in FIG. 2.

However, in the case of this battery cooling (priority)+air conditioning mode, in the embodiment, the heat pump controller 32 maintains the solenoid valve 69 in the open state, and controls the number of revolutions NC of the compressor 2 to be described later as shown in FIG. 12, based on the heat medium temperature Tw detected by the heat medium outlet temperature sensor 76 (transmitted from the battery controller 73). Further, in the embodiment, the heat pump controller 32 controls the opening and closing of the solenoid valve 35 as follows, based on the temperature of the heat absorber 9 (heat absorber temperature Te) which is detected by the heat absorber temperature sensor 48.

Figure 13:
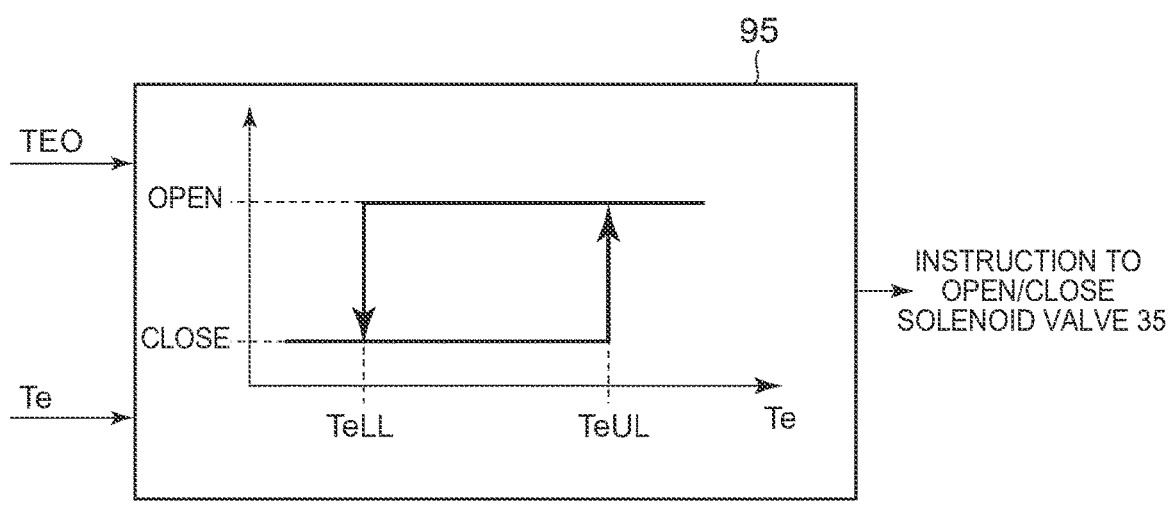
FIG. 13 is a block diagram describing control of a solenoid valve 35 in the battery cooling (priority)+air conditioning mode by the heat pump controller of the control device of FIG. 2.

FIG. 13 shows a block diagram of opening/closing control of the solenoid valve 35 in this battery cooling (priority)+air conditioning mode. The heat absorber temperature Te detected by the heat absorber temperature sensor 48 and a predetermined target heat absorber temperature TEO as a target value of the heat absorber temperature Te are input to the solenoid valve control unit 95 for the heat absorber of the heat pump controller 32. Then, the solenoid valve control unit 95 for the heat absorber has a predetermined temperature difference above and below the target heat absorber temperature TEO, sets a control upper limit value TeUL and a control lower limit value TeLL, and opens the solenoid valve 35 (instruction to open the solenoid valve 35) when the heat absorber temperature Te becomes high from the state in which the solenoid valve 35 is closed and rises to the control upper limit value TeUL (when it exceeds the control upper limit value TeUL or reaches the control upper limit value TeUL or more. The same applies hereinafter). Consequently, the refrigerant flows into the heat absorber 9 and evaporates, thus cooling the air flowing through the air flow passage 3.

After that, when the heat absorber temperature Te drops to the control lower limit value TeLL (when it falls below the control lower limit value TeLL, or when it reaches the control lower limit value TeLL or less. The same applies hereinafter), the solenoid valve 35 is closed (instruction to close the solenoid valve 35). Thereafter, the solenoid valve 35 is repeatedly opened and closed as described above to control the heat absorber temperature Te to the target heat absorber temperature TEO while giving priority to the cooling of the battery 55, thereby cooling the vehicle interior.

(8) Battery Cooling (Single) Mode

Figure 8:
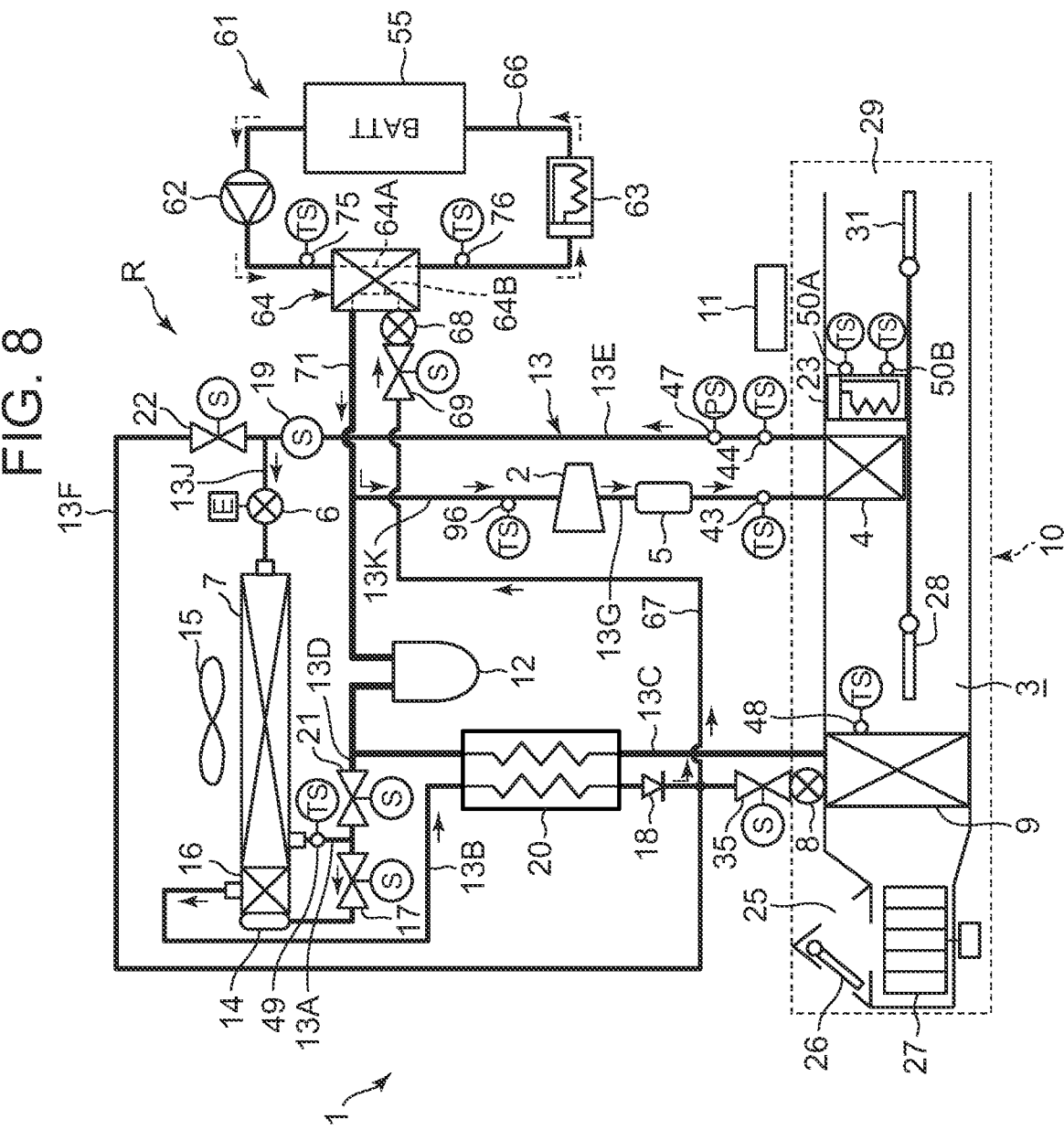
FIG. 8 is a constitutional diagram of the vehicle air conditioning device describing a battery cooling (single) mode by the heat pump controller of the control device of FIG. 2.

Next, when the charging plug of the quick charger is connected and the battery 55 is charged in a turned-OFF state of the air conditioning switch of the air conditioning operating portion 53 regardless of ON/OFF of the ignition, the heat pump controller 32 executes the battery cooling (single) mode where the battery cooling request is made. However, the battery cooling mode is executed when the air conditioning switch is OFF and there is a battery cooling request (when traveling at a high outdoor air temperature, etc.) even at other than when the battery 55 is being charged. FIG. 8 shows the way the refrigerant flows in the refrigerant circuit R in the battery cooling (single) mode (solid line arrows). In the battery cooling (single) mode, the heat pump controller 32 opens the solenoid valve 17 and the solenoid valve 69, and closes the solenoid valve 21, the solenoid valve 22, and the solenoid valve 35.

Then, the compressor 2 and the outdoor blower 15 are operated. Incidentally, the indoor blower 27 is not operated and the auxiliary heater 23 is not energized either. Further, the heat medium heating heater 63 is not energized either in this operation mode.

Thus, the high-temperature high-pressure gas refrigerant discharged from the compressor 2 flows into the radiator 4. Since the air in the air flow passage 3 is not passed through the radiator 4, the refrigerant only passes therethrough. The refrigerant flowing out from the radiator 4 flows through the refrigerant pipe 13E to reach the refrigerant pipe 13J. Since the outdoor expansion valve 6 is fully opened even in this battery cooling (single) mode, the refrigerant flows into the outdoor heat exchanger 7 as it is, in which the refrigerant is cooled by the outdoor air ventilated by the outdoor blower 15 to condense and liquefy.

The refrigerant flowing out from the outdoor heat exchanger 7 flows through the refrigerant pipe 13A, the solenoid valve 17, the receiver drier unit 14, and the supercooling unit 16 into the refrigerant pipe 13B. The refrigerant flowing into the refrigerant pipe 13B all flows into the branch pipe 67 after passing through the internal heat exchanger 20 and the check valve 18 to reach the auxiliary expansion valve 68 through the solenoid valve 69. The refrigerant is decompressed therein and then flows into the refrigerant flow passage 64B of the refrigerant-heat medium heat exchanger 64 to evaporate therein. At this time, the heat absorbing operation is exerted. A circulation is repeated in which the refrigerant evaporated in the refrigerant flow passage 64B flows through the refrigerant pipe 71 and the refrigerant pipe 13K to be sucked into the compressor 2 (this is indicated by the solid line arrows in FIG. 8).

On the other hand, since the circulating pump 62 is operated, the heat medium discharged from the circulating pump 62 flows into the heat medium pipe 66 to reach the heat medium flow passage 64A of the refrigerant-heat medium heat exchanger 64, where heat is absorbed by the refrigerant evaporated in the refrigerant flow passage 64B, whereby the heat medium is cooled. The heat medium flowing out from the heat medium flow passage 64A of the refrigerant-heat medium heat exchanger 64 reaches the heat medium heating heater 63. However, in this operation mode, heat is not generated in the heat medium heating heater 63, and hence the heat medium passes therethrough as it is and reaches the battery 55 where heat exchange with the battery 55 is performed. Thus, the battery 55 is cooled, and the heat medium after having cooled the battery 55 is sucked into the circulating pump 62, thereby repeating this circulation (this is indicated by the broken line arrows in FIG. 8).

Even in this battery cooling (single) mode, the heat pump controller 32 controls the number of revolutions NC of the compressor 2 on the basis of the heat medium temperature Tw detected by the heat medium outlet temperature sensor 76 as will be described later to thereby cool the battery 55.

(9) Defrosting Mode

Next, the defrosting mode of the outdoor heat exchanger 7 will be described. In the heating mode as described above, the refrigerant evaporates in the outdoor heat exchanger 7 and absorbs heat from the outdoor air to be low in temperature. Therefore, the water in the outdoor air grows into frost in the outdoor heat exchanger 7, which adheres thereto.

Thus, the heat pump controller 32 calculates a difference ΔTXO (=TXObase−TXO) between the outdoor heat exchanger temperature TXO (the refrigerant evaporation temperature in the outdoor heat exchanger 7) detected by the outdoor heat exchanger temperature sensor 49, and a refrigerant evaporation temperature TXObase in non-frosting of the outdoor heat exchanger 7. When a state in which the outdoor heat exchanger temperature TXO is lowered than the refrigerant evaporation temperature TXObase in non-frosting, and the difference ΔTXO therebetween has expanded to a predetermined value or more, continues for a predetermined time, the heat pump controller 32 judges that the outdoor heat exchanger 7 is frosted, and sets a predetermined frosting flag.

Then, in the state in which the frosting flag is set and the above-mentioned air conditioning switch of the air conditioning operating portion 53 is turned OFF, when the charging plug for the quick charger is connected, and the battery 55 is charged, the heat pump controller 32 executes the defrosting mode of the outdoor heat exchanger 7 in the following manner.

In this defrosting mode, the heat pump controller 32 sets the refrigerant circuit R to the state of the heating mode of FIG. 4 described above, and then fully opens the valve position of the outdoor expansion valve 6. Then, the heat pump controller 32 operates the compressor 2, causes the high-temperature refrigerant discharged from the compressor 2 to flow into the outdoor heat exchanger 7 via the radiator 4 and the outdoor expansion valve 6 to thereby melt the frost adhered to the outdoor heat exchanger 7. Then, when the outdoor heat exchanger temperature TXO detected by the outdoor heat exchanger temperature sensor 49 becomes higher than a predetermined defrosting end temperature (e.g., +3° C. or the like), the heat pump controller 32 terminates the defrosting mode assuming the defrosting of the outdoor heat exchanger 7 has been completed.

(10) Battery Heating Mode

Further, when the vehicle is performing the air conditioning operation while traveling, or when the battery 55 is being charged, the heat pump controller 32 executes the battery heating mode. In this battery heating mode, the heat pump controller 32 operates the circulating pump 62 and energizes the heat medium heating heater 63. Incidentally, the solenoid valve 69 is closed.

Thus, the heat medium discharged from the circulating pump 62 flows into the heat medium pipe 66 to reach the heat medium flow passage 64A of the refrigerant-heat medium heat exchanger 64, and passes therethrough to reach the heat medium heating heater 63. Since, at this time, the heat medium heating heater 63 is generating heat, the heat medium is heated by the heat medium heating heater 63 and rises in temperature, and then reaches the battery 55 and exchanges heat with the battery 55. Consequently, a circulation is repeated in which the battery 55 is heated, and the heat medium after having heated the battery 55 is sucked into the circulating pump 62.

In this battery heating mode, the heat pump controller 32 controls heat generation of the heat medium heating heater 63 on the basis of the heat medium temperature Tw detected by the heat medium outlet temperature sensor 76 as will be described later, thereby adjusting the heat medium temperature Tw to a predetermined target heat medium temperature TWO to heat the battery 55.

(11) Control of Compressor 2 by Heat Pump Controller 32

Figure 9:
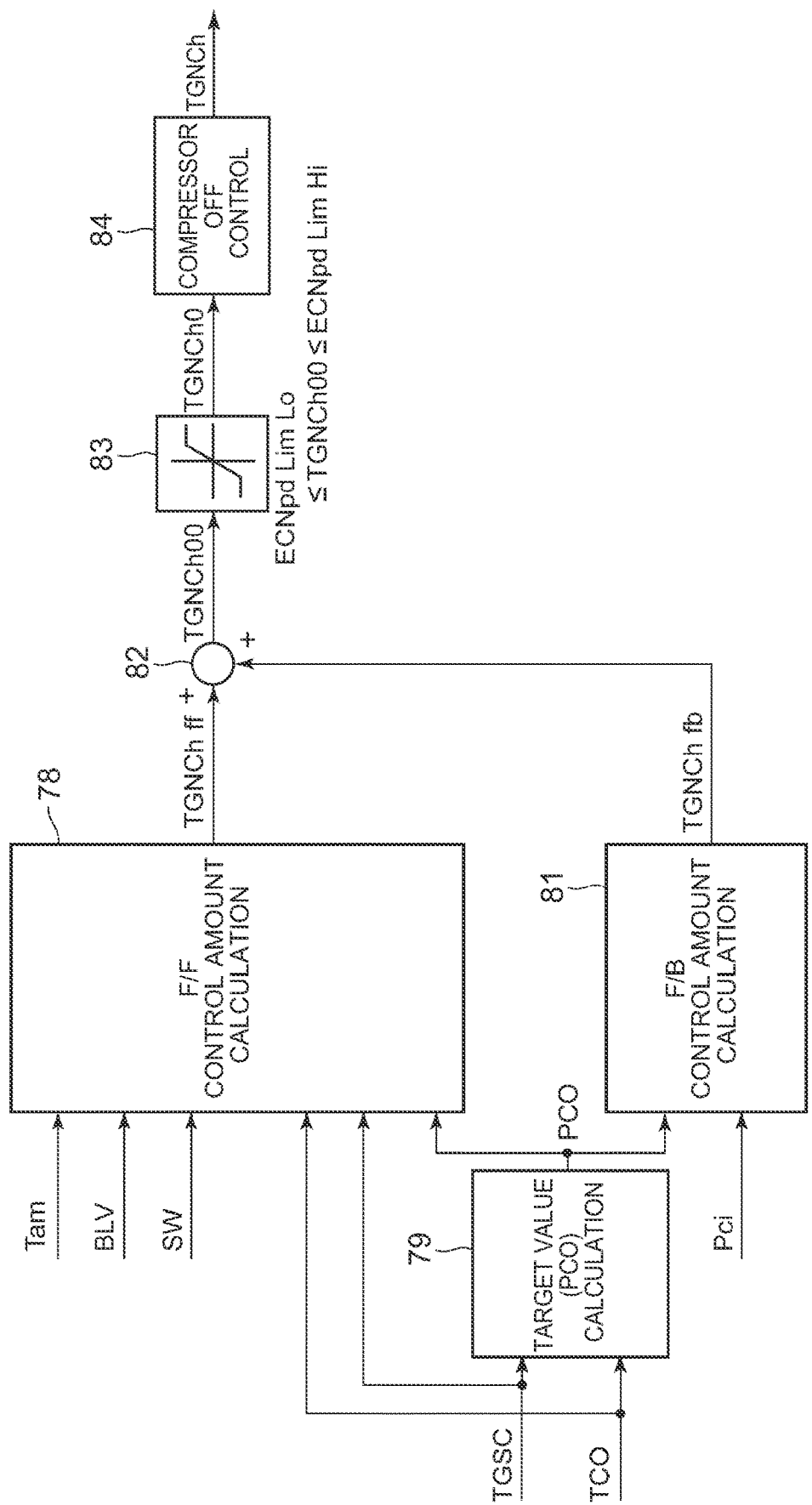
FIG. 9 is a control block diagram regarding compressor control of the heat pump controller of the control device of FIG. 2.

Further, the heat pump controller 32 calculates a target number of revolutions (compressor target number of revolutions) TGNCh of the compressor 2 by the control block diagram of FIG. 9 on the basis of the radiator pressure Pci in the heating mode, and calculates a target number of revolutions (compressor target number of revolutions) TGNCc of the compressor 2 by the control block diagram of FIG. 10 on the basis of the heat absorber temperature Te in the dehumidifying and cooling mode, the cooling mode, and the air conditioning (priority)+battery cooling mode. Incidentally, in the dehumidifying and heating mode, the lower one of the compressor target number of revolutions TGNCh and the compressor target number of revolutions TGNCc is selected. Also, in the battery cooling (priority)+air conditioning mode and the battery cooling (single) mode, a target number of revolutions (compressor target number of revolutions) TGNCw of the compressor 2 is calculated by the control block diagram of FIG. 12, based on the heat medium temperature Tw.

(11-1) Calculation of Compressor Target Number of Revolutions TGNCh Based on Radiator Pressure Pci The control of the compressor 2 based on the radiator pressure Pci will first be described in detail with reference to FIG. 9. FIG. 9 is a control block diagram of the heat pump controller 32 which calculates the target number of revolutions (compressor target number of revolutions) TGNCh of the compressor 2 based on the radiator pressure Pci. An F/F (feed forward) control amount calculation section 78 of the heat pump controller 32 calculates an F/F control amount TGNChff of the compressor target number of revolutions on the basis of the outdoor air temperature Tam obtained from the outdoor air temperature sensor 33, the blower voltage BLV of the indoor blower 27, the air volume ratio SW by the air mix damper 28 obtained by SW=(TAO−Te)/(Thp−Te), a target supercool degree TGSC being a target value of the supercool degree SC of the refrigerant at the outlet of the radiator 4, the above-mentioned target heater temperature TCO being a target value of the heater temperature Thp, and the target radiator pressure PCO being a target value of the pressure of the radiator 4.

Incidentally, the heater temperature Thp is an air temperature (estimated value) on the leeward side of the radiator 4, and is calculated (estimated) from the radiator pressure Pci detected by the radiator pressure sensor 47 and the refrigerant outlet temperature Tci of the radiator 4 detected by the radiator outlet temperature sensor 44. Further, the supercool degree SC is calculated from the refrigerant inlet temperature Tcxin and the refrigerant outlet temperature Tci of the radiator 4 detected by the radiator inlet temperature sensor 43 and the radiator outlet temperature sensor 44.

The target radiator pressure PCO is calculated by a target value calculation section 79 based on the target supercool degree TGSC and the target heater temperature TCO described above. Further, an F/B (feedback) control amount calculation section 81 calculates an F/B control amount TGNChfb of the compressor target number of revolutions by PID calculation or PI calculation based on the target radiator pressure PCO and the radiator pressure Pci. Then, the F/F control amount TGNChff calculated by the F/F control amount calculation section 78 and the F/B control amount TGNChfb calculated by the F/B control amount calculation section 81 are added by an adder 82 to be input to a limit setting section 83 as TGNCh00.

In the limit setting section 83, the TGNCh00 is added with limits of a lower limit number of revolutions ECNpdLimLo of controlling and an upper limit number of revolutions ECNpdLimHi of controlling and set to be TGNCh0, and then determined as a compressor target number of revolutions TGNCh through a compressor OFF control section 84. That is, the number of revolutions NC of the compressor 2 is limited to the upper limit number of revolutions ECNpdLimHi or less. In the normal mode, the heat pump controller 32 controls the operation of the compressor 2 by the compressor target number of revolutions TGNCh calculated based on this radiator pressure Pci so that the radiator pressure Pci becomes the target radiator pressure PCO.

Incidentally, when a state in which the compressor target number of revolutions TGNCh becomes the above-described lower limit number of revolutions ECNpdLimLo, and the radiator pressure Pci rises to a predetermined upper limit value PUL of the predetermined upper limit value PUL and a predetermined lower limit value PLL set above and below the target radiator pressure PCO (a state in which it exceeds the upper limit value PUL or reaches the upper limit value PUL or less. The same applies hereinafter) continues for a predetermined time th1, the compressor OFF control section 84 stops the compressor 2 to enter an ON-OFF mode of ON-OFF controlling the compressor 2.

In the ON-OFF mode of the compressor 2, when the radiator pressure Pci is lowered to the lower limit value PLL (when it falls below the lower limit value PLL or becomes less than or equal to the lower limit value PLL. The same applies hereinafter), the compressor 2 is started to operate with the compressor target number of revolutions TGNCh as the lower limit number of revolutions ECNpdLimLo. When the radiator pressure Pci rises to the upper limit value PUL in that state, the compressor 2 is stopped again. That is, the operation (ON) and stop (OFF) of the compressor 2 at the lower limit number of revolutions ECNpdLimLo are repeated. Then, when a state in which the radiator pressure Pci does not become higher than the lower limit value PUL after the radiator pressure Pci is lowered to the lower limit value PUL, and the compressor 2 is started, continues for a predetermined time th2, the ON-OFF mode of the compressor 2 is ended to return the compressor 2 to the normal mode.

(11-2) Calculation of Compressor Target Number of Revolutions TGNCc Based on Heat Absorber Temperature Te Next, the control of the compressor 2 based on the heat absorber temperature Te will be described in detail using FIG. 10. FIG. 20 is a control block diagram of the heat pump controller 32 which calculates the target number of revolutions (compressor target number of revolutions) TGNCc of the compressor 2 based on the heat absorber temperature Te. An F/F control amount calculation section 86 of the heat pump controller 32 calculates an F/F control amount TGNCcff of the compressor target number of revolutions on the basis of the outdoor air temperature Tam, the air volume Ga (may be the blower voltage BLV of the indoor blower 27) of the air circulating in the air flow passage 3, the target radiator pressure PCO, and the target heat absorber temperature TEC being the target value of the heat absorber temperature Te.

Further, an F/B control amount calculation section 87 calculates an F/B control amount TGNCcfb of the compressor target number of revolutions by PID calculation or PI calculation based on the target heat absorber temperature TEO and the heat absorber temperature Te. Then, the F/F control amount TGNCcff calculated by the F/F control amount calculation section 86 and the F/B control amount TGNCcfb calculated by the F/B control amount calculation section 87 are added by an adder 88 to be input to a limit setting section 89 as TGNCc00.

In the limit setting section 89, the TGNCc00 is added with limits of a lower limit number of revolutions TGNCcLimLo of controlling and an upper limit number of revolutions TGNCcLimHi of controlling and set to be TGNCc0, and then determined as a compressor target number of revolutions TGNCc through a compressor OFF control section 91. Accordingly, if the value TGNCc00 added by the adder 8A is within the upper limit number of revolutions TGNCcLimHi and the lower limit number of revolutions TGNCcLimnLo and the ON-OFF mode to be described later is not set, this value TGNCc00 is the compressor target number of revolutions TGNCc (which becomes the number of revolutions NC of the compressor 2). In the normal mode, the heat pump controller 32 controls the operation of the compressor 2 by the compressor target number of revolutions TGNCc calculated based on this heat absorber temperature Te so that the heat absorber temperature Te becomes the target heat absorber temperature TEO.

Incidentally, when a state in which the compressor target number of revolutions TGNCc becomes the above-described lower limit number of revolutions TGNCcLimLo, and the heat absorber temperature Te is lowered to the control lower limit value TeLL of the control upper limit value TeUL and the control lower limit value TeLL set above and below the target heat absorber temperature TEO continues for a predetermined time tc1, the compressor OFF control section 91 stops the compressor 2 to enter an ON-OFF mode of ON-OFF controlling the compressor 2.

In the ON-OFF mode of the compressor 2 in this case, when the heat absorber temperature Te rises to the control upper limit value TeUL, the compressor 2 is started to operate with the compressor target number of revolutions TGNCc as the lower limit number of revolutions TGNCcLimLo. When the heat absorber temperature Te is lowered to the control lower limit value TeLL in that state, the compressor 2 is stopped again. That is, the operation (ON) and stop (OFF) of the compressor 2 at the lower limit number of revolutions TGNCcLimbo are repeated. Then, when a state in which the heat absorber temperature Te does not become lower than the control upper limit value TeUL after the heat absorber temperature Te rises to the control upper limit value TeUL and the compressor 2 is started, continues for a predetermined time tc2, the ON-OFF mode of the compressor 2 in this case is ended to make its return to the normal mode.

(11-3) Calculation of Compressor Target Number of Revolutions TGNCw Based on Heat Medium Temperature Tw Next, the control of the compressor 2 based on the heat medium temperature Tw will be described in detail using FIG. 12. FIG. 12 is a control block diagram of the heat pump controller 32 which calculates the target number of revolutions (compressor target number of revolutions) TGNCw of the compressor 2 based on the heat medium temperature Tw. An F/F control amount calculation section 92 of the heat pump controller 32 calculates an F/F control amount TGNCcwff of the compressor target number of revolutions on the basis of the outdoor air temperature Tam, a flow rate Gw (calculated from the output of the circulating pump 62) of the heat medium in the device temperature adjusting device 61, the amount of heat generation of the battery 55 (transmitted from the battery controller 73), the battery temperature Tcell (transmitted from the battery controller 73), and the target heat medium temperature TWO being the target value of the heat medium temperature Tw.

Further, an F/B control amount calculation section 93 calculates an F/B control amount TGNCwfb of the compressor target number of revolutions by PID calculation or PI calculation based on the target heat medium temperature TWO and the heat medium temperature Tw (transmitted from the battery controller 73). Then, the F/F control amount TGNCwff calculated by the F/F control amount calculation section 92 and the F/B control amount TGNCwfb calculated by the F/B control amount calculation section 93 are added by an adder 94 to be input to a limit setting section 96 as TGNCw00.

In the limit setting section 96, the TGNCw00 is added with limits of a lower limit number of revolutions TGNCwLimLo of controlling and an upper limit number of revolutions TGNCwLimHi of controlling and set to be TGNCw0, and then determined as a compressor target number of revolutions TGNCw through a compressor OFF control section 97. Accordingly, if the value TGNCw00 added by the adder 94 is within the upper limit number of revolutions TGNCwLimHi and the lower limit number of revolutions TGNCwLimLo and the ON-OFF mode to be described later is not set, this value TGNCw00 is the compressor target number of revolutions TGNCw (which becomes the number of revolutions NC of the compressor 2) In the normal mode, the heat pump controller 32 controls the operation of the compressor 2 by the compressor target number of revolutions TGNCw calculated based on this heat medium temperature Tw so that the heat medium temperature Tw becomes the target heat medium temperature TWO within the above-described appropriate temperature range.

Incidentally, when a state in which the compressor target number of revolutions TGNCw becomes the above-described lower limit number of revolutions TGNCwLimLo, and the heat medium temperature Tw is lowered to the control lower limit value TwLL of the control upper limit value TwUL and the control lower limit value TwLL set above and below the target heat medium temperature TWO continues for a predetermined time tw1, the compressor OFF control section 97 stops the compressor 2 to enter an ON-OFF mode of ON-OFF controlling the compressor 2.

In the ON-OFF mode of the compressor 2 in this case, when the heat medium temperature Tw rises to the control upper limit value TwUL, the compressor 2 is started to operate with the compressor target number of revolutions TGNCw as the lower limit number of revolutions TGNCwLimLo. When the heat medium temperature Tw is lowered to the control lower limit value TwLL in that state, the compressor 2 is stopped again. That is, the operation (ON) and stop (OFF) of the compressor 2 at the lower limit number of revolutions TGNCwLimLo are repeated. Then, when a state in which the heat medium temperature Tw does not become lower than the control upper limit value TwUL after the heat medium temperature Tw rises to the control upper limit value TwUL and the compressor 2 is started, continues for a predetermined time tw2, the ON-OFF mode of the compressor 2 in this case is ended to make its return to the normal mode.

(12) Control of Heat Medium Heating Heater 63 by Heat Pump Controller 32

Figure 14:
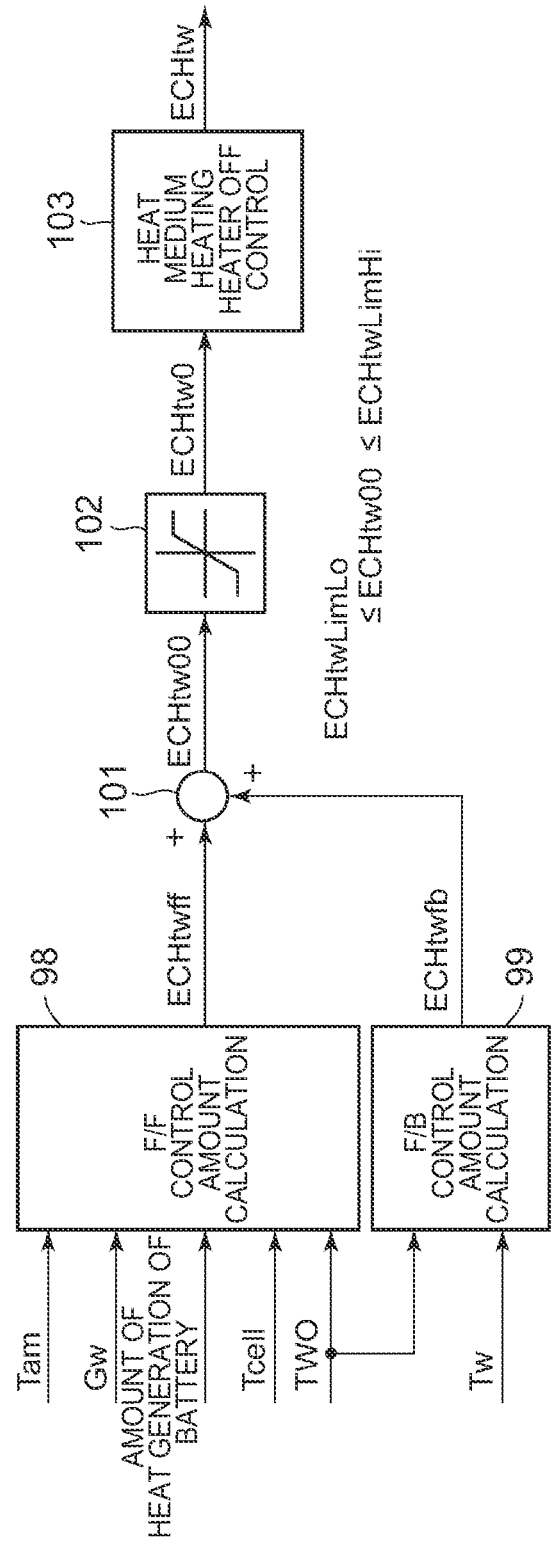
FIG. 14 is a control block diagram regarding heat medium heating heater control of the heat pump controller of the control device of FIG. 2.

Next, the control of the heat medium heating heater 63 based on the heat medium temperature Tw in the above-described battery heating mode will be described in detail using FIG. 14. FIG. 14 is a control block diagram of the heat pump controller 32 which calculates a target amount of heat generation ECHtw of the heat medium heating heater 63 based on the heat medium temperature Tw. An F/F control amount calculation section 98 of the heat pump controller 32 calculates an F/F control amount ECHtff of the target amount of heat generation on the basis of the outdoor air temperature Tam, the flow rate Gw (calculated from the output of the circulating pump 62) of the heat medium in the device temperature adjusting device 61, the amount of heat generation of the battery 55 (transmitted from the battery controller 73), the battery temperature Tcell (transmitted from the battery controller 73), and the target heat medium temperature TWO being the target value of the heat medium temperature Tw.

Further, an F/B control amount calculation section 99 calculates an F/B control amount ECHtwfb of the target amount of heat generation by PID calculation or PI calculation based on the target heat medium temperature TWO and the heat medium temperature Tw (transmitted from the battery controller 73). Then, the F/F control amount ECHtwff calculated by the F/F control amount calculation section 93 and the F/B control amount ECHtwfb calculated by the F/B control amount calculation section 99 are added by an adder 101 to be input to a limit setting section 102 as ECHtw00.

In the limit setting section 102, the ECHtw00 is added with limits of a lower limit amount of heat generation ECHtwLimLo (for example, energization OFF) of controlling and an upper limit amount of heat generation ECHtwLimHi of controlling and set to be ECHtw0, and then determined as a target amount of heat generation ECHtw through a heat medium heating heater OFF control section 103. Accordingly, if the value ECHtw00 added by the adder 101 is within the upper limit amount of heat generation ECHtwLimHi and the lower limit amount of heat generation ECHtwLimLo and the ON-OFF mode to be described later is not set, this value ECHtw00 is the target amount of heat generation ECHtw (which becomes the amount of heat generation of the heat medium heating heater 63). In the normal mode, the heat pump controller 32 controls the heat generation of the heat medium heating heater 63 by the target amount of heat generation ECHtw calculated based on this heat medium temperature Tw so that the heat medium temperature Tw becomes the target heat medium temperature TWO.

Incidentally, when a state in which the target amount of heat generation ECHtw becomes the above-described lower limit amount of heat generation ECHtwLimLo, and the heat medium temperature Tw rises to the control upper limit value TwUL of the control upper limit value TwUL and the control lower limit value TwLL set above and below the target heat medium temperature TWO continues for a predetermined time tw1, the heat medium heating heater OFF control section 103 stops energization of the heat medium heating heater 63 to enter an ON-OFF mode of ON-OFF controlling the heat medium heating heater 63.

In the ON-OFF mode of the heat medium heating heater 63 in this case, when the heat medium temperature Tw is lowered to the control lower limit value TwLL, the heat medium heating heater 63 is energized and energized as a predetermined low amount of heat generation. When the heat medium temperature Tw rises to the control upper limit value TwUL in that state, the energization of the heat medium heating heater 63 is stopped again. That is, the heat generation (ON) of the heat medium heating heater 63 and the stop (OFF) of the heat generation thereof at the predetermined low amount of heat generation are repeated. Then, when a state in which the heat medium temperature Tw does not become higher than the control lower limit value TwLL after the heat medium temperature Tw is lowered to the control lower limit value TwLL and the heat medium heating heater 63 is energized, continues for a predetermined time tw2, the ON-OFF mode of the heat medium heating heater 63 in this case is ended to make its return to the normal mode.

(13) Protection of Compressor 2 when Refrigerant Circuit R is Blocked

Next, while referring to FIG. 15, description will be made about the protection of the compressor 2 by the heat pump controller 32 when the refrigerant circuit R related to cooling of the battery 55 is blocked. As described above, when the solenoid valve 69 (chiller) which controls the inflow of the refrigerant into the refrigerant-heat medium heat exchanger 64 is blocked due to a mechanical abnormality or clogging, the refrigerant circuit R is immediately blocked in the battery cooling (single) mode (FIG. 8). Further, even in the battery cooling (priority)+air conditioning mode (FIG. 7), when the solenoid valve 69 (chiller) is blocked due to a mechanical abnormality or clogging, the refrigerant circuit R is blocked when the solenoid valve 35 (cabin) is closed. This also applies when the refrigerant flow passage 64B of the refrigerant-heat medium heat exchanger 64, the branch pipe 67 connected to the refrigerant flow passage 64B, and the refrigerant pipe 71 are clogged (hereinafter, these are referred to as peripheral circuits of the solenoid valve 69).

When the refrigerant circuit R is blocked in this way, the refrigerant (including oil) discharged from the compressor is accumulated in the outdoor heat exchanger 7 large in capacity, and the refrigerant and oil cannot be returned to the compressor 2. Eventually, burning occurs in the compressor 2 and a failure (breakage) occurs therein. In this case, the heat pump controller 32 can grasp the electrical abnormality of the solenoid valve 69 from the transfer of signals and the state of a potential, but cannot electrically grasp the mechanical abnormality and the clogging.

(13-1) Compressor Protection Control when Refrigerant Circuit is Blocked (Part 1)

Thus, the heat pump controller 32 constituting the control device 11 executes protection control of determining the blockage of the refrigerant circuit R generated when the solenoid valve 35 (cabin) is closed in the battery cooling (single) mode and in the battery cooling (priority)+air conditioning mode, based on the degree of decrease in the heat medium temperature Tw (an index indicating the temperature of the battery 55 (vehicle-mounted device)), and stopping the compressor 2 in the present embodiment.

Figure 15:
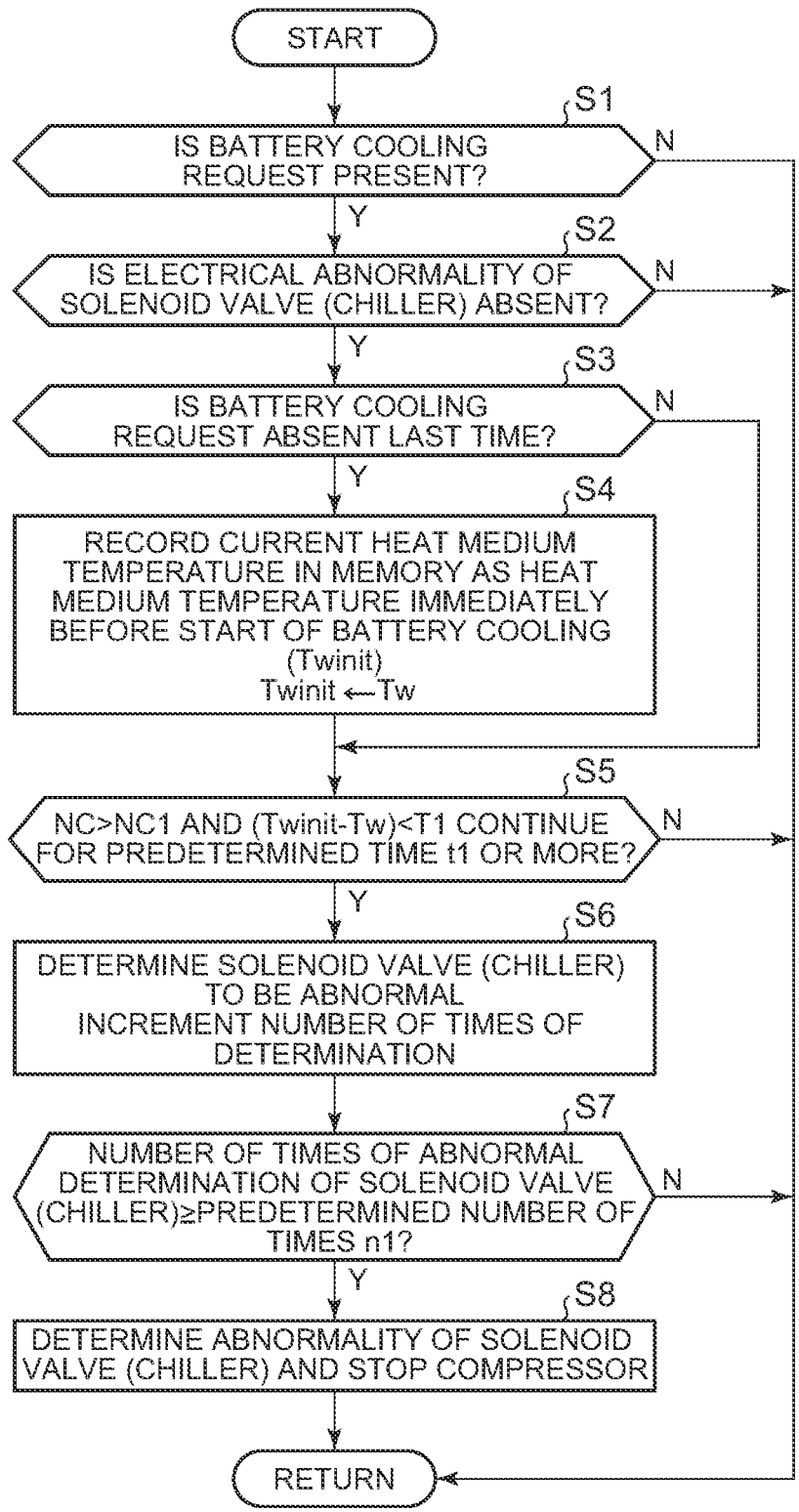
FIG. 15 is a flowchart describing an embodiment of compressor protection control at the time of refrigerant circuit blockage due to a mechanical abnormality of the solenoid valve (chiller) by the heat pump controller of the control device of FIG. 2 (Embodiment 1)

FIG. 15 is a flowchart showing an example of a blockage determination of the refrigerant circuit R executed by the heat pump controller 32 and protection control of the compressor 2 where the refrigerant circuit R is blocked. The heat pump controller 32 determines in Step S1 of FIG. 15 whether or not the battery cooling request from the battery controller 73 described above has been input. When the battery cooling request is made as described above, the heat pump controller 32 enters into the operation mode to cool the battery 55 in any of the battery cooling (single) mode, the battery cooling (priority)+air conditioning mode, or the air conditioning (priority)+battery cooling mode. When the battery cooling request is made in Step S1, the heat pump controller 32 proceeds to Step S2 to determine whether or not the solenoid valve 69 (chiller) has an electrical abnormality. That is, due to the presence of this Step 32, the heat pump controller 32 determines that the refrigerant circuit R is blocked by distinguishing it from the electrical abnormality of the solenoid valve 69.

When the electrical abnormality has not occurred in the solenoid valve 69 in Step S2, the heat pump controller 32 proceeds to Step S3 to determine whether or not there was a battery cooling request last time (previous sampling cycle). When the battery cooling request is absent, the heat pump controller 32 proceeds to Step S4, whereas when the battery cooling request is present, the heat pump controller 32 proceeds to Step S5 in Step S4, the current heat medium temperature Tw detected by the heat medium outlet temperature sensor 76 is recorded in a memory 32M as a heat medium temperature Twinit immediately before the start of battery cooling. That is, the heat pump controller 32 sets the heat medium temperature Tw when the battery cooling request is input in Step S4 (at the start of cooling of the battery 55) to the heat medium temperature Twinit immediately before the start of battery cooling.

Next, the heat pump controller 32 determines in Step S5 whether or not it is established that a state in which the number of revolutions NC of the compressor 2 is higher than a predetermined number of revolutions NC1 (for example, 3000 rpm, etc.), and the difference (Twinit-Tw) between the heat medium temperature Twinit immediately before the start of battery cooling recorded in the memory 32M and the current heat medium temperature Tw is smaller than a predetermined value T1 continues for a predetermined time t1 or more (determination condition).

The above difference (Twinit-Tw) means the degree of decrease in the heat medium temperature Tw from the start of cooling of the battery 55. Incidentally, instead of such a difference, for example, a ratio (Twinit/Tw) or the like may be adopted as the degree of decrease in the heat medium temperature Tw, but in the embodiment, the difference is used. Then, when the above determination condition is not established, the heat pump controller proceeds from Step S5 to another control.

Here, when the refrigerant circuit is blocked due to the mechanical abnormality or clogging of the solenoid valve 69 or its peripheral circuit is blocked due to clogging, the refrigerant is not circulated in the refrigerant-heat medium heat exchanger 64 even though the compressor 2 is operated at the number of revolutions higher than the number of revolutions NC1. Therefore, the heat medium flowing through the heat medium flow passage 64A is not cooled. Thus, the heat medium temperature Tw hardly changes from the heat medium temperature Twinit immediately before the start of battery cooling, and the above-mentioned difference (Twinit-Tw) becomes smaller than the predetermined value T1.

When such a state continues for the predetermined time t1 or more (determination condition is established), the heat pump controller 32 proceeds from Step S5 to Step S6 to determine that an abnormality (mechanical abnormality) occurs in the solenoid valve 69 (chiller), or the solenoid valve 69 and its peripheral circuits are clogged, so that the refrigerant circuit R is clogged, and increments the number of determinations (recorded in the memory 32M). Next, the heat pump controller proceeds to Step 37 to determine whether or not the number of times of abnormality determination (number of times of determination of blockage of the refrigerant circuit R) of the solenoid valve 69 is made to be equal to or greater than a predetermined number of times n1 (for example, 3 times). If the predetermined number of times n1 is not reached, then the heat pump controller proceeds to other control.

When the number of times of abnormality determination of the solenoid valve 69 (the number of times of determination of blockage of the refrigerant circuit R) becomes the predetermined number of times n1 or more in Step S7, the heat pump controller 32 proceeds to Step S8 to determine that the mechanical abnormality occurs in the solenoid valve 69, or the solenoid valve 69 and its peripheral circuits are clogged, thereby blocking the refrigerant circuit R, and then stops the compressor 2.

Thus, the heat pump controller 32 of the control device 11 stops the compressor 2 based on the blockage of the refrigerant circuit R. Therefore, it becomes possible to avoid in advance, the failure of the compressor 2, which is caused by the blockage of the refrigerant circuit R for cooling the battery 55, and it becomes possible to improve the reliability.

In particular, in the embodiment, when the state in which the number of revolutions NC of the compressor 2 is higher than the predetermined number of revolutions NC1, and the degree of decrease in the heat medium temperature Tw (an index indicating the temperature of the battery 55) is smaller than the predetermined value T1 continues for the predetermined time t1, the heat pump controller 32 determines that the refrigerant circuit R is blocked. Therefore, it is possible to accurately determine that the refrigerant circuit R is blocked due to the abnormality or clogging of the solenoid valve 69 or clogging of the peripheral circuits thereof. It is thus possible to avoid in advance, false detection of determining blockage of the refrigerant circuit even though it is not blocked and inconvenience of it being left for a long time even though it is blocked.

Further, in the embodiment, since the heat pump controller 32 determines the blockage of the refrigerant circuit R by distinguishing it from the electrical abnormality of the solenoid valve 69 (chiller), it is possible to clarify that the blockage has occurred due to the mechanical abnormality of the solenoid valve 69 and the clogging of its peripheral circuits and to encourage the replacement of parts.

Further, in the embodiment, when the heat pump controller 32 determines more than the predetermined number of times n1 that the refrigerant circuit R is blocked, the heat pump controller 32 determines the blockage of the refrigerant circuit R and stops the compressor 2. It is therefore possible to effectively avoid the inconvenience that the compressor 2 is stopped unnecessarily due to the false detection.

(13-2) Notification of Compressor Protection Stop Due to Refrigerant Circuit Blockage Here, in the embodiment, when the compressor 2 is stopped based on the blockage of the refrigerant circuit R, the heat pump controller 32 notifies the air conditioning controller 45 of that effect. Upon receiving this notification, the air conditioning controller 45 displays on the display 53A of the air conditioning operating portion 53 that the compressor 2 has been stopped due to the blockage of the refrigerant circuit R (predetermined notification operation). Consequently, it is possible to notify a user that the blockage has occurred in the refrigerant circuit R due to a mechanical failure of the solenoid valve 69 or the like, and encourage a prompt response.

(13-3) Operation of Circulating Pump after Stopping Compressor

Further, in the embodiment, the heat pump controller 32 continues to operate the circulating pump 62 of the device temperature adjusting device 61 even after stopping the compressor 2 based on the blockage of the refrigerant circuit R as described above. That is, the circulation of the heat medium to the battery 55 is continued. Even if the heat medium is not cooled by the refrigerant, it circulates in the heat medium pipe 66 to receive cooling action by the outdoor air. Therefore, even after the compressor 2 is stopped due to the blockage of the refrigerant circuit R, it is possible to suppress a rise in the temperature of the battery 55 as much as possible by the circulation of the heat medium.

(13-4) Restarting of Compressor (Part 1)

The heat pump controller 32 allows the compressor 2 to be restarted after a lapse of a predetermined time after stopping the compressor 2 cased on the fact that the refrigerant circuit R is blocked as described above. Consequently, it is possible to avoid in advance, the inconvenience that the suction side of the compressor 2 becomes a negative pressure at the time of restarting.

(13-5) Restarting of Compressor (Part 2)

Alternatively, the heat pump controller 32 permits the compressor 2 to be restarted when the suction refrigerant temperature Ts of the compressor 2 detected by the suction temperature sensor 46 becomes a predetermined value or more. This also makes it possible to avoid in advance, the inconvenience that the suction side of the compressor 2 becomes a negative pressure at the time of restarting.

Embodiment 2

(13-6) Compressor Protection Control when Refrigerant Circuit is Closed (Part 2)

Next, another example of protection control of the compressor 2 when the refrigerant circuit R is closed will be described with reference to FIG. 16. In this embodiment, the heat pump controller 32 executes protection control of determining the blockage of the refrigerant circuit R generated when the solenoid valve 35 (cabin) is closed in the battery cooling (single) mode and in the battery cooling (priority)+air conditioning mode, based on the degree of decrease in the temperature of the heat medium before and after heat exchange with the refrigerant in the refrigerant-heat medium heat exchanger 64, and stopping the compressor 2.

Figure 16:
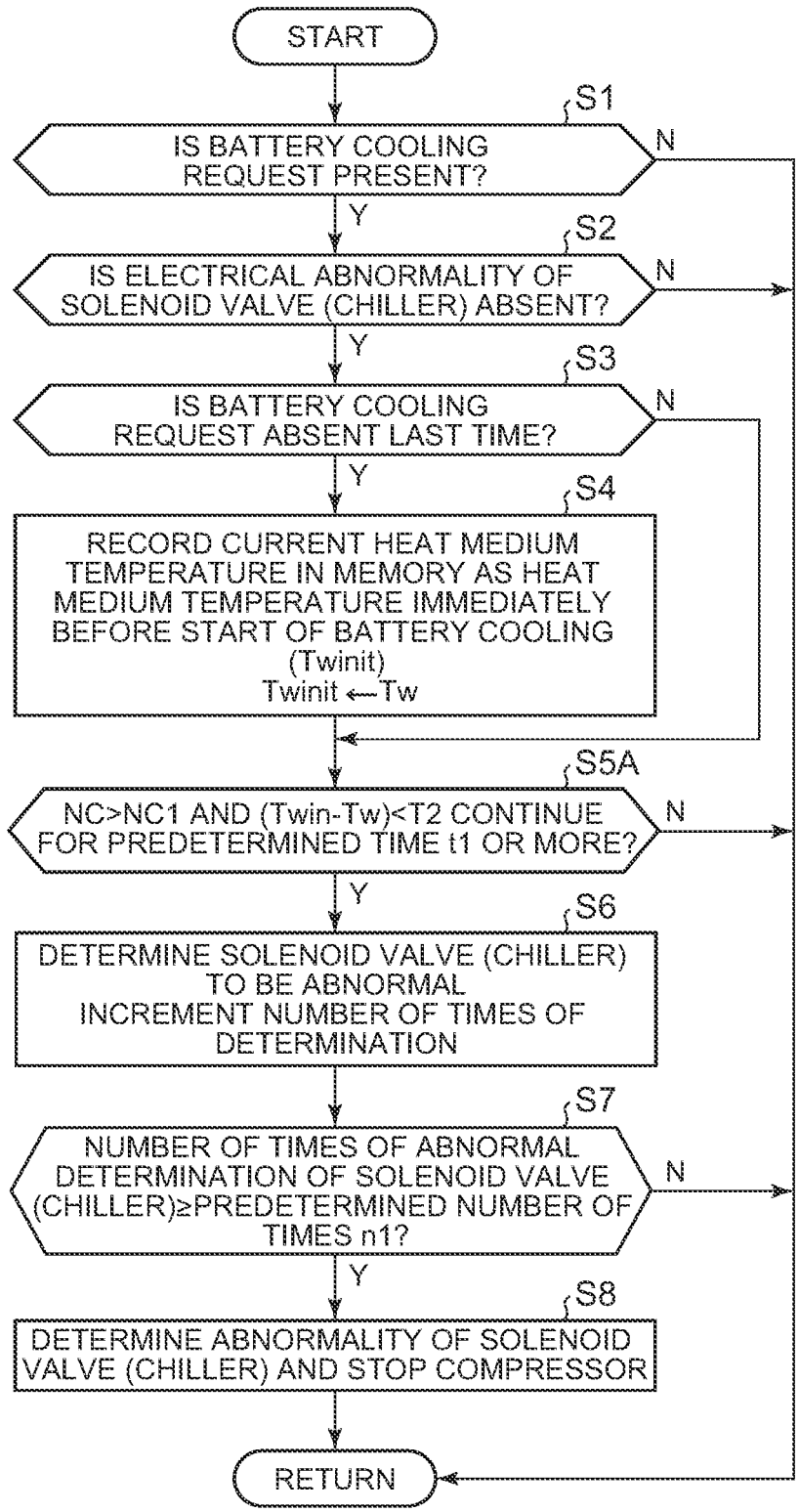
FIG. 16 is a flowchart describing another embodiment of compressor protection control at the time of refrigerant circuit blockage due to a mechanical abnormality of the solenoid valve (chiller) by the heat pump controller of the control device of FIG. 2 (Embodiment 2)

FIG. 16 is a flowchart showing a blockage determination of the refrigerant circuit R executed by the heat pump controller 32 and protection control of the compressor 2 where the refrigerant circuit R is blocked. Incidentally, in FIG. 16, Steps indicated by the same reference numerals as those in FIG. 15 are assumed to have the same or similar operations, and description thereof will be omitted. In this embodiment, Step 35A of FIG. 16 is executed instead of Step S5 of FIG. 15.

In Step S5A in this case, the heat pump controller 32 determines whether or not it is established that a state in which the number of revolutions NC of the compressor 2 is higher than the above-described predetermined number of revolutions NC1, and a difference (Twin−Tw) between the heat medium inlet temperature Twin (temperature of the heat medium before heat exchange with the refrigerant in the refrigerant-heat medium heat exchanger 64) detected by the heat medium inlet temperature sensor 75 and the heat medium temperature Tw (temperature of the heat medium after heat exchange with the refrigerant in the refrigerant-heat medium heat exchanger 64) detected by the heat medium outlet temperature sensor 76 is smaller than a predetermined value T2 continues for the predetermined time t1 or more (determination condition).

The above difference (Twin−Tw) means the degree of decrease in the temperature of the heat medium before and after the heat exchange with the refrigerant in the refrigerant-heat medium heat exchanger 64. Incidentally, instead of such a difference, for example, a ratio (Twin/Tw) or the like may be adopted as the degree of decrease in the heat medium temperature Tw, but in the embodiment, the difference is used. Then, when the above determination condition is not established, the heat pump controller proceeds from Step S5A to another control.

Here, when the refrigerant circuit is blocked due to a mechanical abnormality or clogging of the solenoid valve 69, or blocked due to clogging of its peripheral circuits, the refrigerant is not circulated in the refrigerant-heat medium heat exchanger 64 even if the compressor 2 is operated at the number of revolutions higher than the number of revolutions NC1. Therefore, the heat medium flowing through the heat medium flow passage 64A is not cooled. Accordingly, the heat medium temperature Tw is almost the same as the heat medium inlet temperature Twin, and the above-mentioned difference (Twin−Tw) becomes smaller than the predetermined value T2.

When such a state continues for the predetermined time t1 or more (determination condition is established), the heat pump controller 32 proceeds from Step S5A to Step S6, and thereafter executes stop protection of the compressor 2 in the same Steps S6 to S8 as described above. Thus, even if it is determined that the refrigerant circuit R has been blocked where a state in which the number of revolutions NC of the compressor 2 is higher than the predetermined number of revolutions NW, and the degree of decrease in the heat medium temperature Tw after heat exchange with the refrigerant is smaller than the predetermined value T2 continues for a predetermined time n1, it is possible to accurately determine that the refrigerant circuit R is blocked and realize protection of the compressor 2.

Incidentally, even in the embodiment in this case, the heat pump controller 32 executes each control of notification of the compressor protection stop due to the blockage of the refrigerant circuit in the above-mentioned (13-2), the operation of the circulating pump after the compressor stop in the above-mentioned (13-3), and the restart of the compressor in the above-mentioned (13-4) and (13-5).

Embodiment 3

(13-7) Compressor Protection Control when Refrigerant Circuit is Blocked (Part 3)

Next, another example of protection control of the compressor 2 when the refrigerant circuit R is blocked will be described with reference to FIG. 17. In this embodiment, the heat pump controller 32 executes protection control of determining the blockage of the refrigerant circuit R which occurs when the solenoid valve 35 (cabin) is closed in the battery cooling (single) mode and in the battery cooling (priority)+air conditioning modem, based on the degree of deviation of a cooling capacity Pchiller of the device temperature adjusting device 61 (having a heat medium circulating device) from a cooling capacity Pcomp of the compressor 2, and stopping the compressor 2.

Figure 17:
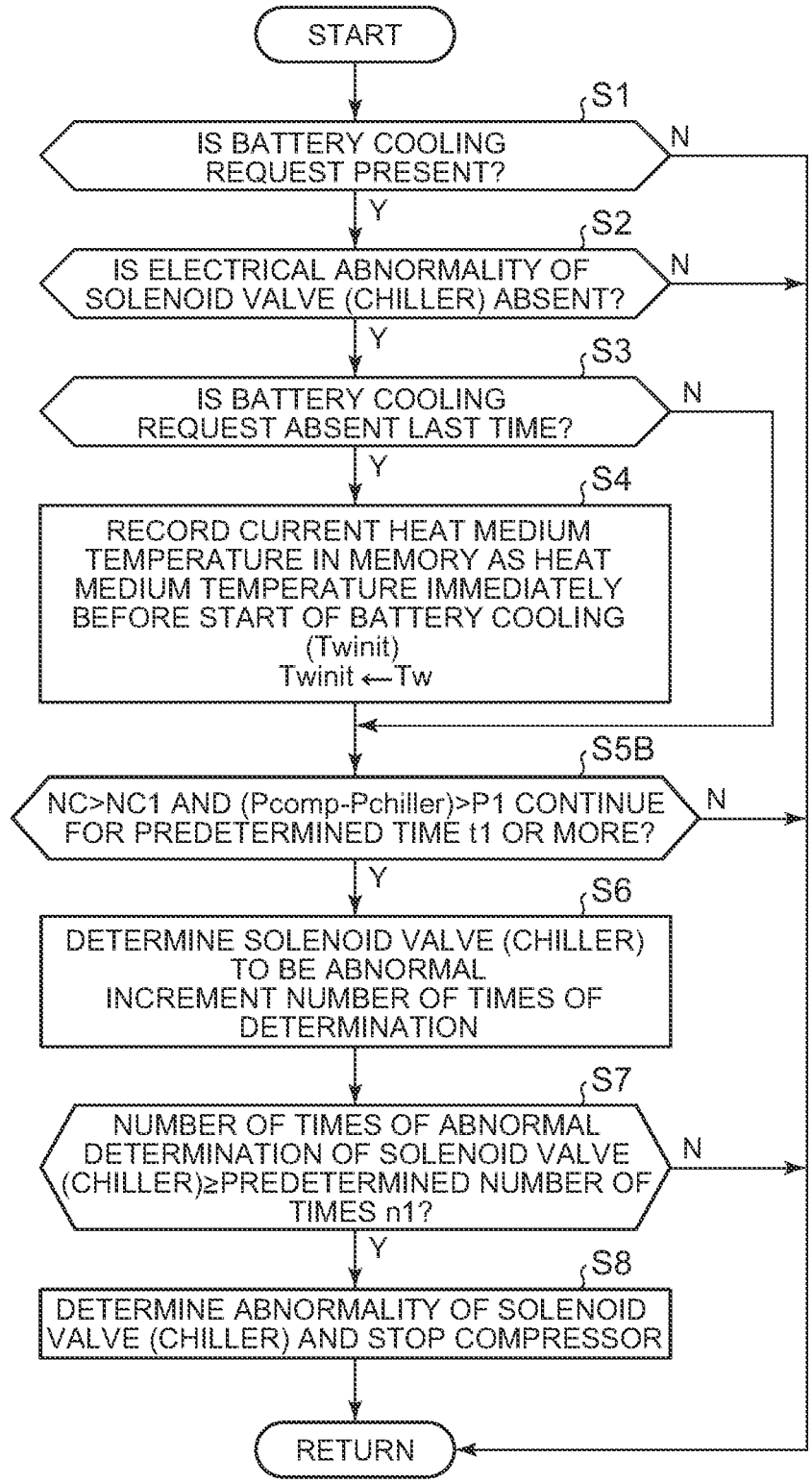
FIG. 17 is a flowchart describing a further embodiment of compressor protection control at the time of refrigerant circuit blockage due to a mechanical abnormality of the solenoid valve (chiller) by the heat pump controller of the control device of FIG. 2 (Embodiment 3)

FIG. 17 is a flowchart showing a blockage determination of the refrigerant circuit R executed by the heat pump controller 32 in this embodiment and protection control of the compressor 2 when the refrigerant circuit R is blocked. Incidentally, in FIG. 17, Steps indicated by the same reference numerals as those in FIG. 15 are assumed to have the same or similar operations, and description thereof will be omitted. In this embodiment, Step S5B of FIG. 17 is executed instead of Step S5 of FIG. 15.

In Step S5B in this embodiment, the heat pump controller 32 determines whether or not it is established that a state in which the number of revolutions NC of the compressor 2 is higher than the above-described predetermined number of revolutions NC1, and the difference (Pcomp−Pchiller) between the cooling capacity Pcomp of the compressor 2 and the cooling capacity Pchiller of the device temperature adjusting device 61 is larger than a predetermined value P1 continues for a predetermined time t1 or more (determination condition).

The cooling capacity Pcomp of the compressor 2 is calculated based on the number of revolutions NC of the compressor 2. Further, the cooling capacity Pchiller of the device temperature adjusting device 61 is calculated based on the difference (Twin−Tw) between the heat medium inlet temperature Twin (the temperature of the heat medium before heat exchange with the refrigerant in the refrigerant-heat medium heat exchanger 64) detected by the heat medium inlet temperature sensor 75 and the heat medium temperature Tw (the temperature of the heat medium after heat exchange with the refrigerant in the refrigerant-heat medium heat exchanger 64) detected by the heat medium outlet temperature sensor 76, and the circulation amount of the heat medium flowing through the heat medium flow passage 64A (which is derived from the number of revolutions of the circulating pump 62).

Incidentally, instead of such a difference, e.g., a ratio (Pcomp/Pchiller) or the like may be adopted as the degree of decrease in the deviation of Pchiller from Pcomp in this case, but in the embodiment, the difference is used. Then, when the above determination condition is not met, the heat pump controller proceeds from Step S5B to another control.

Here, when the refrigerant circuit is blocked due to a mechanical abnormality or clogging of the solenoid valve 69, or blocked due to clogging of its peripheral circuits, the refrigerant is not circulated in the refrigerant-heat medium heat exchanger 64 even if the compressor 2 is operated at the number of revolutions higher than the number of revolutions NC1. Therefore, the heat medium flowing through the heat medium flow passage 64A is not cooled. Accordingly, the cooling capacity Pchiller of the device temperature adjusting device 61 becomes significantly deviate from the cooling capacity Pcomp of the compressor 2, and the above-mentioned difference (Pcomp−Pchiller) becomes larger than the predetermined value P1.

When such a state continues for the predetermined time t1 or more (determination condition is established), the heat pump controller 32 proceeds from Step S5B to Step S6, and thereafter executes stop protection of the compressor 2 in the same Steps S6 to S1 as described above. Thus, even if it is determined that the refrigerant circuit R has been blocked where a state in which the number of revolutions NC of the compressor 2 is higher than the predetermined number of revolutions NC1, and the degree of deviation of the cooling capacity Pchiller of the device temperature adjusting device 61 from the cooling capacity Pcomp of the compressor 2 is larger than the predetermined value P1 continues for the predetermined time t1, it is possible to accurately determine that the refrigerant circuit R is blocked and realize protection of the compressor 2.

Incidentally, even in the embodiment in this case, the heat pump controller 32 executes each control of notification of the compressor protection stop due to the blockage of the refrigerant circuit in the above-mentioned (13-2), the operation of the circulating pump after the compressor stop in the above-mentioned (13-3), and the restart of the compressor in the above-described (13-4) and (13-5).

Embodiment 4

(13-8) Compressor Protection Control when Refrigerant Circuit is Blocked (Part 4)

Next, a further example of protection control of the compressor 2 when the refrigerant circuit R is blocked will be described with reference to FIG. 18 in this embodiment, the heat pump controller 32 executes protection control of determining the blockage of the refrigerant circuit R which occurs when the solenoid valve 35 (cabin) is closed in the battery cooling (single) mode and in the battery cooling (priority)+air conditioning modem, based on the degree of decrease in the battery temperature Tcell (index indicating the temperature of the battery 55 (vehicle-mounted device)), and stopping the compressor 2.

FIG. 18 is a flowchart showing a blockage determination of the refrigerant circuit R executed by the heat pump controller 32 in this embodiment and protection control of the compressor 2 when the refrigerant circuit R is blocked. Incidentally, in FIG. 18, Steps indicated by the same reference numerals as those in FIG. 15 are assumed to have the same or similar operations, and description thereof will be omitted. In this embodiment, Step 34A and Step 35C of FIG. 18 are executed instead of Step S4 and Step 35 of FIG. 15.

In Step 34A in this case, the current battery temperature Tcell detected by the battery temperature sensor 77 is recorded in the memory 32M as a battery temperature Tcellinit immediately before the start of battery cooling. That is, the heat pump controller 32 sets the battery temperature Tcell when the battery cooling request is input in Step S4A (at the start of cooling of the battery 55) to the battery temperature Tcellinit immediately before the start of battery cooling.

Next, in Step 35C in this case, the heat pump controller 32 determines whether or not it is established that a state in which the number of revolutions NC of the compressor 2 is higher than the above-mentioned predetermined number of revolutions NC1, and a difference (Tcellinit-Tcell) between the battery temperature Tcellinit immediately before the start of battery cooling recorded in the memory 32M and the current battery temperature Tcell is smaller than a predetermined value T1 continues for a predetermined time t1 or more (determination condition).

The above difference (Tcellinit-Tcell) means the degree of decrease in the battery temperature Tcell from the start of cooling of the battery 55. Incidentally, instead of such a difference, for example, a ratio (Tcellinit/Tcell) or the like may be adopted as the degree of decrease in the battery temperature Tcell, but in the embodiment, the difference is used. Then, when the above determination condition is not established, the heat pump controller proceeds from Step SSC to another control.

Here, when the refrigerant circuit is blocked due to the mechanical abnormality or clogging of the solenoid valve 69 or blocked due to clogging of its peripheral circuits, the refrigerant is not circulated in the refrigerant-heat medium heat exchanger 64 even though the compressor 2 is operated at the number of revolutions higher than the number of revolutions NC1. Therefore, the heat medium flowing through the heat medium flow passage 64A is not cooled, and the battery 55 is not cooled either. Thus, the battery temperature Tcell hardly changes from the battery temperature Tellinit immediately before the start of battery cooling, and the above-mentioned difference (Tcellinit-Tcell) becomes smaller than the predetermined value T1.

When such a state continues for the predetermined time t1 or more (determination condition is established), the heat pump controller 32 proceeds from Step S5C to Step S6, and thereafter executes stop protection of the compressor 2 in the same Step S6 to Step S8 as described above. Thus, even if it is determined that the refrigerant circuit R has been blocked where a state in which the number of revolutions NC of the compressor 2 is higher than the predetermined number of revolutions NC1, and the degree of decrease in the battery temperature Tcell (index indicating the temperature of the battery 55) is smaller than the predetermined value T1 continues for the predetermined time t1, it is possible to accurately determine that the refrigerant circuit R is blocked and realize protection of the compressor 2.

Incidentally, even in the embodiment in this case, the heat pump controller 32 executes each control of notification of the compressor protection stop due to the blockage of the refrigerant circuit in the above-mentioned (13-2), the operation of the circulating pump after the compressor stop in the above-mentioned (13-3), and the restart of the compressor in the above-described (13-4) and (13-5).

Incidentally, in the embodiment, the device temperature adjusting device 61, which is the in-vehicle device temperature adjusting device of the present invention is provided in the vehicle air conditioning device 1 for air-conditioning the vehicle interior, but the inventions other than claim 13 are not limited to it and are also effective for an in-vehicle device temperature adjusting device that only adjusts the temperature of the battery 55 (in-vehicle device) without air conditioning in the vehicle interior.

Further, in the embodiment, the device temperature adjusting device 61 which circulates the heat medium between the battery 55 and the refrigerant-heat medium heat exchanger 64 is used, and the battery 55 is cooled by the refrigerant via the heat medium. However, the present invention is not limited to it. Instead of the refrigerant-heat medium heat exchanger 64, a heat exchanger for heat absorption that directly exchanges heat with the battery 55 is provided, and the refrigerant may be caused to absorb heat in this heat exchanger to cool the battery 55.

Then, in that case, as in the case of the embodiment 4 described above, the battery temperature Tcell is used, and the refrigerant circuit R may be determined to have been blocked where the state in which the number of revolutions NC of the compressor 2 is higher than the predetermined number of revolutions NC1, and the degree of decrease in the battery temperature Tcell (index indicating the temperature of the battery 55) is smaller than the predetermined value T1 continues for the Predetermined time t1.

Further, the configuration and numerical values of the refrigerant circuit R described in the embodiments are not limited thereto. It is needless to say that they can be changed in the scope not departing from the gist of the present invention.

DESCRIPTION OF REFERENCE NUMERALS 1 vehicle air conditioning device
2 compressor
4 radiator (indoor heat exchanger)
6 outdoor expansion valve
7 outdoor heat exchanger (heat exchanger for radiation)
8 indoor expansion valve
9 heat absorber
11 control device
32 heat pump controller (constituting part of control device)
35 solenoid valve (cabin)
45 air conditioning controller (constituting part of control device)
55 battery (in-vehicle device)
61 device temperature adjusting device (in-vehicle device temperature adjusting device, heat medium circulating circuit)
62 circulating pump
64 refrigerant-heat medium heat exchanger (heat exchanger for heat absorption
66 heat medium pipe
68 auxiliary expansion valve
69 solenoid valve (chiller)
73 battery controller
75 heat medium inlet temperature sensor
76 heat medium outlet temperature sensor
77 battery temperature sensor
R refrigerant circuit

The invention claimed is:
1. An in-vehicle device temperature adjusting device which serves as a temperature adjusting device to adjust the temperature of an in-vehicle device, comprising:

a refrigerant circuit having a compressor which compresses a refrigerant, a heat-radiating heat exchanger for letting the refrigerant radiate heat, and a heat-absorbing heat exchanger for letting the refrigerant absorb heat to cool the in-vehicle device; and a control device, wherein the control device stops the compressor based on a blockage of the refrigerant circuit, and wherein when a state in which the number of revolutions of the compressor is higher than a predetermined number of revolutions, and the degree of decrease in an index indicating the temperature of the in-vehicle device is smaller than a predetermined value continues for a predetermined time, the control device determines that the refrigerant circuit is blocked.

2. The in-vehicle device temperature adjusting device according to claim 1, wherein the index indicating the temperature of the in-vehicle device is the temperature of the in-vehicle device.

3. The in-vehicle device temperature adjusting device according to claim 1, wherein the in-vehicle device includes a heat medium circulating device which circulates a heat medium, wherein the heat-absorbing heat exchanger cools the heat medium with the refrigerant and cools the in-vehicle device through the heat medium, and wherein the index indicating the temperature of the in-vehicle device is the temperature of the heat medium.

4. The in-vehicle device temperature adjusting device according to claim 3, wherein even after the compressor is stopped, the control device continues to circulate the heat medium by the heat medium circulating device.

5. The in-vehicle device temperature adjusting device according to claim 4, wherein the refrigerant circuit has a valve device which controls the inflow of the refrigerant into the heat-absorbing heat exchanger, and wherein the control device determines the blockage of the refrigerant circuit in distinction from an electrical abnormality of the valve device.

6. The in-vehicle device temperature adjusting device according to claim 1, wherein the refrigerant circuit has a valve device which controls the inflow of the refrigerant into the heat-absorbing heat exchanger, and wherein the control device determines the blockage of the refrigerant circuit in distinction from an electrical abnormality of the valve device.

7. The in-vehicle device temperature adjusting device according to claim 6, wherein when the control device determines more than a predetermined number of times that the refrigerant circuit is blocked, the control device stopes stops the compressor.

8. The in-vehicle device temperature adjusting device according to claim 1, wherein when the control device determines more than a predetermined number of times that the refrigerant circuit is blocked, the control device stops the compressor.

9. The in-vehicle device temperature adjusting device according to claim 8, wherein after the compressor is stopped, the control device permits restarting of the compressor after a lapse of a predetermined time.

10. The in-vehicle device temperature adjusting device according to claim 8, wherein when the temperature of the refrigerant on a suction side of the compressor becomes greater than or equal to a predetermined value, the control device permits restarting of the compressor.

11. The in-vehicle device temperature adjusting device according to claim 1, wherein after the compressor is stopped, the control device permits restarting of the compressor after a lapse of a predetermined time.

12. The in-vehicle device temperature adjusting device according to claim 1, wherein when the temperature of the refrigerant on a suction side of the compressor becomes greater than or equal to a predetermined value, the control device permits restarting of the compressor.

13. The in-vehicle device temperature adjusting device according to claim 12, wherein the control device has a predetermined notification capability, and wherein when the compressor is stopped based on the blockage of the refrigerant circuit, the control device executes a predetermined notification operation.

14. The in-vehicle device temperature adjusting device according to claim 1, wherein the control device has a predetermined notification capability, and wherein when the compressor is stopped based on the blockage of the refrigerant circuit, the control device executes a predetermined notification operation.

15. A vehicle air conditioning device having an in-vehicle device temperature adjusting device according to claim 14, wherein the refrigerant circuit further includes an indoor heat exchanger for exchanging heat between air supplied to the interior of the vehicle and the refrigerant, and an outdoor heat exchanger as the heat-radiating heat exchanger, which is provided outside the vehicle interior, and air-conditions the interior of the vehicle with the indoor heat exchanger.

16. A vehicle air conditioning device having an in-vehicle device temperature adjusting device according to claim 1, wherein the refrigerant circuit further includes an indoor heat exchanger for exchanging heat between air supplied to an interior of the vehicle and the refrigerant, and an outdoor heat exchanger as the heat-radiating heat exchanger, which is provided outside the vehicle interior, and air-conditions the interior of the vehicle with the indoor heat exchanger.

17. An in-vehicle device temperature adjusting device which serves as a temperature adjusting device to adjust the temperature of an in-vehicle device, comprising:

a refrigerant circuit having a compressor which compresses a refrigerant, a heat-radiating heat exchanger for letting the refrigerant radiate heat, and a heat-absorbing heat exchanger for letting the refrigerant absorb heat to cool the in-vehicle device; and a control device, wherein the control device stops the compressor based on the blockage of the refrigerant circuit, wherein the in-vehicle device includes a heat medium circulating device which circulates a heat medium, wherein the heat-absorbing heat exchanger cools the heat medium with the refrigerant and cools the in-vehicle device through the heat medium, and wherein when a state in which the number of revolutions of the compressor is higher than a predetermined number of revolutions, and the degree of decrease in the temperature of the heat medium after heat exchange with the refrigerant is smaller than a predetermined value continues for a predetermined time, the control device determines that the refrigerant circuit is blocked.

18. An in-vehicle device temperature adjusting device which serves as a temperature adjusting device to adjust the temperature of an in-vehicle device, comprising:

a refrigerant circuit having a compressor which compresses a refrigerant, a heat-radiating heat exchanger for letting the refrigerant radiate heat, and a heat-absorbing heat exchanger for letting the refrigerant absorb heat to cool the in-vehicle device; and a control device, wherein the control device stops the compressor based on the blockage of the refrigerant circuit, wherein the in-vehicle device includes a heat medium circulating device which circulates a heat medium, wherein the heat-absorbing heat exchanger cools the heat medium with the refrigerant and cools the in-vehicle device through the heat medium, and wherein when a state in which the number of revolutions of the compressor is higher than a predetermined number of revolutions, and the degree of deviation of a cooling capacity of the heat medium circulating device from a cooling capacity of the compressor is larger than a predetermined value continues for a predetermined time, the control device determines that the refrigerant circuit is blocked.

19. The in-vehicle device temperature adjusting device according to claim 18, wherein even after the compressor is stopped, the control device continues to circulate the heat medium by the heat medium circulating device.

\* \* \* \* \*